United States Patent
Liu et al.

(10) Patent No.: US 10,317,644 B2
(45) Date of Patent: *Jun. 11, 2019

(54) OPTICAL IMAGE CAPTURING SYSTEM

(71) Applicant: ABILITY OPTO-ELECTRONICS TECHNOLOGY CO.LTD., Taichung (TW)

(72) Inventors: Yao-Wei Liu, Taichung (TW); Yeong-Ming Chang, Taichung (TW)

(73) Assignee: ABILITY OPTO-ELECTRONICS TECHNOLOGY CO.LTD., Taichung (TW)

( * ) Notice: Subject to any disclaimer, the term of this patent is extended or adjusted under 35 U.S.C. 154(b) by 881 days.

This patent is subject to a terminal disclaimer.

(21) Appl. No.: 14/861,204

(22) Filed: Sep. 22, 2015

(65) Prior Publication Data

US 2016/0356988 A1    Dec. 8, 2016

(30) Foreign Application Priority Data

Jun. 4, 2015 (TW) .............................. 104118192 A

(51) Int. Cl.
*G02B 3/02* (2006.01)
*G02B 13/00* (2006.01)

(52) U.S. Cl.
CPC .................................. *G02B 13/004* (2013.01)

(58) Field of Classification Search
CPC .................................................. G02B 13/0045
See application file for complete search history.

(56) References Cited

U.S. PATENT DOCUMENTS

2017/0108668 A1*  4/2017  Sekine ............... G02B 13/0045

FOREIGN PATENT DOCUMENTS

| CN | 106154497 A | 11/2016 |
|----|----|----|
| TW | 201520591 A | 1/2015 |
| TW | 201640173 A | 11/2016 |

* cited by examiner

*Primary Examiner* — James C. Jones
(74) *Attorney, Agent, or Firm* — Muncy, Geissler, Olds & Lowe, P.C.

(57) ABSTRACT

A four-piece optical lens for capturing image is provided. In order from an object side to an image side, the optical lens along the optical axis includes a first lens with positive refractive power, a second lens with refractive power, a third lens with refractive power and a fourth lens with refractive power. At least one of the image-side surface and object-side surface of each of the four lens elements are aspheric. The optical lens can increase aperture value and improve the imagining quality for use in compact cameras.

23 Claims, 18 Drawing Sheets

OPTICAL IMAGE CAPTURING SYSTEM

CROSS-REFERENCE TO RELATED APPLICATION

This application claims the benefit of Taiwan Patent Application No. 104118192, filed on Jun. 4, 2015, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a second-lens or a third-lens design. However, the requirement for the higher pixels and the requirement for a large aperture of an end user, like functionalities of micro filming and night view, or the requirement of wide view angle of the portable electronic device have been raised. But the optical image capturing system with the large aperture design often produces more aberration resulting in the deterioration of quality in peripherical image formation and difficulties of manufacturing, and the optical image capturing system with wide view angle design increases distortion rate in image formation, thus the optical image capturing system in prior arts cannot meet the requirement of the higher order camera lens module.

Therefore, how to effectively increase quantity of incoming light and view angle of the optical lenses, not only further improves total pixels and imaging quality for the image formation, but also considers the equity design of the miniaturized optical lenses, becomes a quite important issue.

SUMMARY OF THE INVENTION

The aspect of embodiment of the present disclosure directs to an optical image capturing system and an optical image capturing lens which use combination of refractive powers, convex and concave surfaces of four-piece optical lenses (the convex or concave surface in the disclosure denotes the geometrical shape of an image-side surface or an object-side surface of each lens on an optical axis) to increase the quantity of incoming light of the optical image capturing system and the view angle of the optical lenses, and to improve total pixels and imaging quality for image formation, so as to be applied to minimized electronic products.

The term and its definition to the lens element parameter in the embodiment of the present invention are shown as below for further reference.

The Lens Element Parameter Related to a Length or a Height in the Lens Element

A height for image formation of the optical image capturing system is denoted by HOI. A height of the optical image capturing system is denoted by HOS. A distance from the object-side surface of the first lens element to the image-side surface of the fourth lens element is denoted by InTL. A distance from the image-side surface of the fourth lens element to an image plane is denoted by InB. InTL+InB=HOS. A distance from an aperture stop (aperture) to an image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. An entrance pupil diameter of the optical image capturing system is denoted by HEP. A maximum effective half diameter position of any surface of single lens element means the vertical height between the effective half diameter (EHD) and the optical axis where the incident light of the maximum view angle of the system passes through the farthest edge of the entrance pupil on the EHD of the surface of the lens element. For example, the maximum effective half diameter position of the object-side surface of the first lens element is denoted as EHD 11. The maximum effective half diameter position of the image-side of the first lens element is denoted as EHD12. The maximum effective half diameter position of the object-side surface of the second lens element is denoted as EHD21. The maximum half effective half diameter position of the image-side surface of the second lens element is denoted as EHD22. The maximum effective half diameter position of any surfaces of the remaining lens elements of the optical image capturing system can be referred as mentioned above.

The lens element parameter related to an arc length of the lens element shape and an outline of surface A length of outline curve of the maximum effective half diameter position of any surface of a single lens element refers to a length of outline curve from an axial point on the surface of the lens element to the maximum effective half diameter position of the surface along an outline of the surface of the lens element and is denoted as ARS. For example, the length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of the maximum effective half diameter position of the object-side surface of the second lens element is denoted as ARS21. The length of outline curve of the maximum effective half diameter position of the image-side surface of the second lens element is denoted as ARS22. The lengths of outline curve of the maximum effective half diameter position of any surface of the other lens elements in the optical image capturing system are denoted in the similar way.

A length of outline curve of a half of an entrance pupil diameter (HEP) of any surface of a signal lens element refers to a length of outline curve of the half of the entrance pupil diameter (HEP) from an axial point on the surface of the lens element to a coordinate point of vertical height with a distance of the half of the entrance pupil diameter from the optical axis on the surface along the outline of the surface of the lens element and is denoted as ARE. For example, the length of the outline curve of the half of the entrance pupil diameter (HEP) of the object-side surface of the first lens element is denoted as ARE11. The length of the outline curve of the half of the entrance pupil diameter (HEP) of the image-side surface of the first lens element is denoted as ARE12. The length of the outline curve of the half of the entrance pupil diameter (HEP) of the object-side surface of the second lens element is denoted as ARE21. The length of the outline curve of the half of the entrance pupil diameter (HEP) of the image-side surface of the second lens element is denoted as ARS22. The lengths of outline curves of the half of the entrance pupil diameters (HEP) of any surface of the other lens elements in the optical image capturing system are denoted in the similar way.

The Lens Element Parameter Related to a Depth of the Lens Element Shape

A horizontal distance in parallel with an optical axis from a maximum effective half diameter position to an axial point on the object-side surface of the fourth lens element is denoted by InRS41 (instance). A horizontal distance in parallel with an optical axis from a maximum effective half diameter position to an axial point on the image-side surface of the fourth lens element is denoted by InRS42 (instance).

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C31 on the object-side surface of the third lens element and the optical axis is HVT31 (instance). A distance perpendicular to the optical axis between a critical point C32 on the image-side surface of the third lens element and the optical axis is HVT32 (instance). A distance perpendicular to the optical axis between a critical point C41 on the object-side surface of the fourth lens element and the optical axis is HVT41 (instance). A distance perpendicular to the optical axis between a critical point C42 on the image-side surface of the fourth lens element and the optical axis is HVT42 (instance). Distances perpendicular to the optical axis between critical points on the object-side surfaces or the image-side surfaces of other lens elements and the optical axis are denoted in the similar way described above.

The object-side surface of the fourth lens element has one inflection point IF411 which is nearest to the optical axis, and the sinkage value of the inflection point IF411 is denoted by SGI411. SGI411 is a horizontal shift distance in parallel with the optical axis from an axial point on the object-side surface of the fourth lens element to the inflection point which is nearest to the optical axis on the object-side surface of the fourth lens element. A distance perpendicular to the optical axis between the inflection point IF411 and the optical axis is HIF411 (instance). The image-side surface of the fourth lens element has one inflection point IF421 which is nearest to the optical axis and the sinkage value of the inflection point IF421 is denoted by SGI421 (instance). SGI421 is a horizontal shift distance in parallel with the optical axis from an axial point on the image-side surface of the fourth lens element to the inflection point which is nearest to the optical axis on the image-side surface of the fourth lens element. A distance perpendicular to the optical axis between the inflection point IF421 and the optical axis is HIF421 (instance).

The object-side surface of the fourth lens element has one inflection point IF412 which is the second nearest to the optical axis and the sinkage value of the inflection point IF412 is denoted by SGI412 (instance). SGI412 is a horizontal shift distance in parallel with the optical axis from an axial point on the object-side surface of the fourth lens element to the inflection point which is the second nearest to the optical axis on the object-side surface of the fourth lens element. A distance perpendicular to the optical axis between the inflection point IF412 and the optical axis is HIF412 (instance). The image-side surface of the fourth lens element has one inflection point IF422 which is the second nearest to the optical axis and the sinkage value of the inflection point IF422 is denoted by SGI422 (instance). SGI422 is a horizontal shift distance in parallel with the optical axis from an axial point on the image-side surface of the fourth lens element to the inflection point which is the second nearest to the optical axis on the image-side surface of the fourth lens element. A distance perpendicular to the optical axis between the inflection point IF422 and the optical axis is HIF422 (instance).

The object-side surface of the fourth lens element has one inflection point IF413 which is the third nearest to the optical axis and the sinkage value of the inflection point IF413 is denoted by SGI413 (instance). SGI413 is a horizontal shift distance in parallel with the optical axis from an axial point on the object-side surface of the fourth lens element to the inflection point which is the third nearest to the optical axis on the object-side surface of the fourth lens element. A distance perpendicular to the optical axis between the inflection point IF413 and the optical axis is HIF413 (instance). The image-side surface of the fourth lens element has one inflection point IF423 which is the third nearest to the optical axis and the sinkage value of the inflection point IF423 is denoted by SGI423 (instance). SGI423 is a horizontal shift distance in parallel with the optical axis from an axial point on the image-side surface of the fourth lens element to the inflection point which is the third nearest to the optical axis on the image-side surface of the fourth lens element. A distance perpendicular to the optical axis between the inflection point IF423 and the optical axis is HIF423 (instance).

The object-side surface of the fourth lens element has one inflection point IF414 which is the fourth nearest to the optical axis and the sinkage value of the inflection point IF414 is denoted by SGI414 (instance). SGI414 is a horizontal shift distance in parallel with the optical axis from an axial point on the object-side surface of the fourth lens element to the inflection point which is the fourth nearest to the optical axis on the object-side surface of the fourth lens element. A distance perpendicular to the optical axis between the inflection point IF414 and the optical axis is HIF414 (instance). The image-side surface of the fourth lens element has one inflection point IF424 which is the fourth nearest to the optical axis and the sinkage value of the inflection point IF424 is denoted by SGI424 (instance). SGI424 is a horizontal shift distance in parallel with the optical axis from an axial point on the image-side surface of the fourth lens element to the inflection point which is the fourth nearest to the optical axis on the image-side surface of the fourth lens element. A distance perpendicular to the optical axis between the inflection point IF424 and the optical axis is HIF424 (instance).

The inflection points on the object-side surfaces or the image-side surfaces of the other lens elements and the distances perpendicular to the optical axis thereof or the sinkage values thereof are denoted in the similar way described above.

The Lens Element Parameter Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%-100%. An offset of the spherical aberration is denoted by DFS. An offset of the coma aberration is denoted by DFC.

The lateral aberration of the stop is denoted as STA to assess the function of the specific optical image capturing system. The tangential fan or sagittal fan may be applied to calculate the STA of any view fields, and in particular, to calculate the STA of the maximum reference wavelength (e.g. 650 nm) and the minimum reference wavelength (e.g. 470 nm) for serve as the standard of the optimal function. The aforementioned direction of the tangential fan can be further defined as the positive (overhead-light) and negative (lower-light) directions. STA of the max operation wavelength is defined as the distance between the image position of the specific view field of max operation wavelength and the image position of the specific view field of the reference primary wavelength (e.g. wavelength of 555 nm), and STA of the minimum operation wavelength is defined as the distance between the image position of the specific view field of the minimum operation wavelength and the image position of the specific view field of the reference primary wavelength (e.g. wavelength of 555 nm) are assessed the function of the specific optical image capturing system to be optimal. Both STA of the max operation wavelength and STA of the minimum operation wavelength on the image position of vertical height with a distance from the optical axis to 70% HOI (i.e. 0.7 HOI), which are smaller than 20 μm, are served as the sample. The numerical, which are smaller than 10 μm, are also served as the sample.

A height for image formation on the image plane perpendicular to the optical axis in the optical image capturing system is denoted by HOI. A lateral aberration of the longest operation wavelength of a positive direction tangential fan of the optical image capturing system passing through an edge of the entrance pupil and incident on the image plane by 0.7 HOI is denoted as PLTA. A lateral aberration of the shortest operation wavelength of the positive direction tangential fan of the optical image capturing system passing through the edge of the entrance pupil and incident on the image plane by 0.7 HOI is denoted as PSTA. A lateral aberration of the longest operation wavelength of a negative direction tangential fan of the optical image capturing system passing through the edge of the entrance pupil and incident on the image plane by 0.7 HOI is denoted as NLTA. A lateral aberration of the shortest operation wavelength of a negative direction tangential fan of the optical image capturing system passing through the edge of the entrance pupil and incident on the image plane by 0.7 HOI is denoted as NSTA. A lateral aberration of the longest operation wavelength of a sagittal fan of the optical image capturing system passing through the edge of the entrance pupil and incident on the image plane by 0.7 HOI is denoted as SLTA.

A lateral aberration of the shortest operation wavelength of the sagittal fan of the optical image capturing system passing through the edge of the entrance pupil and incident on the image plane by 0.7 HOI is denoted as SSTA.

The disclosure provides an optical image capturing system, an object-side surface or an image-side surface of the fourth lens element has inflection points, such that the angle of incidence from each view field to the fourth lens element can be adjusted effectively and the optical distortion and the TV distortion can be corrected as well. Besides, the surfaces of the fourth lens element may have a better optical path adjusting ability to acquire better imaging quality.

The disclosure provides an optical image capturing system, in order from an object side to an image side, including a first, second, third, fourth lens elements and an image plane. The first lens element has refractive power. An object-side surface and an image-side surface of the fourth lens element are aspheric. Focal lengths of the first through fourth lens elements are f1, f2, f3 and f4 respectively. A focal length of the optical image capturing system is f. An entrance pupil diameter of the optical image capturing system is HEP. A distance from an object-side surface of the first lens element to the image plane is HOS. A distance on the optical axis from the object-side surface of the first lens element to the image-side surface of the fourth lens element is InTL. A length of outline curve from an axial point on any surface of any one of the four lens elements to a coordinate point of vertical height with a distance of a half of the entrance pupil diameter from the optical axis on the surface along an outline of the surface is denoted as ARE. The following relations are satisfied: $1.2 \leq f/HEP \leq 6.0$; $0.5 \leq HOS/f \leq 3.0$; $0 < InTL/HOS < 0.9$; and $1 \leq 2(ARE/HEP) \leq 1.5$.

The disclosure provides another optical image capturing system, in order from an object side to an image side, including a first, second, third, fourth lens elements and an image plane. The first lens element has positive refractive power and may have a convex object-side surface near the optical axis. An object-side surface and an image-side surface of the first lens element are aspheric. The second lens element has refractive power. The third lens element has refractive power. The fourth lens element has negative refractive power and an object-side surface and an image-side surface of the fourth lens element are aspheric. At least two lens elements among the first through fourth lens elements respectively have at least one inflection point on at least one surface thereof. At least one of the second through fourth lens elements has positive refractive power. Focal lengths of the first through fourth lens elements are f1, f2, f3 and f4 respectively. A focal length of the optical image capturing system is f. An entrance pupil diameter of the optical image capturing system is HEP. A distance from an object-side surface of the first lens element to the image plane is HOS. A distance on the optical axis from the object-side surface of the first lens element to the image-side surface of the fourth lens element is InTL A length of outline curve from an axial point on any surface of any one of the four lens elements to a coordinate point of vertical height with a distance of a half of the entrance pupil diameter from the optical axis on the surface along an outline of the surface is denoted as ARE. The following relations are satisfied: $1.2 \leq f/HEP \leq 6.0$; $0.5 \leq HOS/f \leq 3.0$; $0 < InTL/HOS < 0.9$; and $1 \leq 2 (ARE/HEP) \leq 1.5$.

The disclosure provides another optical image capturing system, in order from an object side to an image side, including a first, second, third, fourth lens elements and an image plane. At least one surface among an object-side surface and an image-side surface of the fourth lens element has at least one inflection point. Wherein, the optical image capturing system consists of the four lens elements with refractive power and at least two lens elements among the first through third lens elements respectively have at least one inflection point on at least one surface thereof. The first lens element has positive refractive power. The second lens element has refractive power. The third lens element has refractive power. The fourth lens element has negative refractive power and an object-side surface and an image-side surface of the fourth lens element are aspheric. Focal lengths of the first through fourth lens elements are f1, f2, f3 and f4 respectively. A focal length of the optical image capturing system is f. An entrance pupil diameter of the optical image capturing system is HEP. A distance from an object-side surface of the first lens element to the image plane is HOS. A distance on the optical axis from the object-side surface of the first lens element to the image-side surface of the fourth lens element is InTL A length of outline curve from an axial point on any surface of any one of the four lens elements to a coordinate point of vertical height with a distance of a half of the entrance pupil diameter from the optical axis on the surface along an outline of the surface is denoted as ARE. The following relations are satisfied: $1.2 \leq f/HEP \leq 3.5$; $0.5 \leq HOS/f \leq 3.0$; $0 < InTL/HOS < 0.9$; and $1 \leq 2(ARE/HEP) \leq 1.5$.

The length of the outline curve of any surface of a signal lens element in the maximum effective half diameter position affects the functions of the surface aberration correction and the optical path difference in each view field. The longer outline curve may lead to a better function of aberration correction, but the difficulty of the production may become inevitable. Hence, the length of the outline curve of the maximum effective half diameter position of any surface of a signal lens element (ARS) has to be controlled, and especially, the ratio relations (ARS/TP) between the length of the outline curve of the maximum effective half diameter position of the surface (ARS) and the thickness of the lens element to which the surface belongs on the optical axis (TP) has to be controlled. For example, the length of the outline curve of the maximum effective half diameter position of the object-side surface of the first lens element is denoted as ARS11, and the thickness of the first lens element on the optical axis is TP1, and the ratio between both of them is ARS11/TP1. The length of the outline curve of the maximum effective half diameter position of the image-side surface of the first lens element is denoted as ARS12, and the ratio between ARS12 and TP1 is ARS12/TP1. The length of the outline curve of the maximum effective half diameter position of the object-side surface of the second lens element is denoted as ARS21, and the thickness of the second lens element on the optical axis is TP2, and the ratio between both of them is ARS21/TP2. The length of the outline curve of the maximum effective half diameter position of the image-side surface of the second lens element is denoted as ARS22, and the ratio between ARS22 and TP2 is ARS22/TP2. The ratio relations between the lengths of the outline curve of the maximum effective half diameter position of any surface of the other lens elements and the thicknesses of the lens elements to which the surfaces belong on the optical axis (TP) are denoted in the similar way.

The length of outline curve of half of an entrance pupil diameter of any surface of a single lens element especially affects the functions of the surface aberration correction and the optical path difference in each shared view field. The longer outline curve may lead to a better function of aberration correction, but the difficulty of the production may become inevitable. Hence, the length of outline curve of half of an entrance pupil diameter of any surface of a single lens element has to be controlled, and especially, the ratio relationship between the length of outline curve of half of an entrance pupil diameter of any surface of a single lens element and the thickness on the optical axis has to be controlled. For example, the length of outline curve of the half of the entrance pupil diameter of the object-side surface of the first lens element is denoted as ARE11, and the thickness of the first lens element on the optical axis is TP1, and the ratio between both of them is ARE11/TP1. The length of outline curve of the half of the entrance pupil diameter of the image-side surface of the first lens element is denoted as ARE12, and the ratio between ARE12 and TP1 is ARE12/TP1. The length of outline curve of the half of the entrance pupil diameter of the object-side surface of the second lens element is denoted as ARE21, and the thickness of the second lens element on the optical axis is TP2, and the ratio between both of them is ARE21/TP2. The length of outline curve of the half of the entrance pupil diameter of the image-side surface of the second lens element is denoted as ARE22, and the ratio between ARE22 and TP2 is ARE22/TP2. The ratio relations between the lengths of the outline curve of half of the entrance pupil diameter of any surface of the other lens elements and the thicknesses of the lens elements to which the surfaces belong on the optical axis (TP) are denoted in the similar way.

The optical image capturing system described above may be configured to form the image on the image sensing device which is shorter than 1/1.2 inch in diagonal length. The preferred size of the image sensing device is 1/2.3 inch. The pixel size of the image sensing device is smaller than 1.4 micrometers (μm), preferably the pixel size thereof is smaller than 1.12 micrometers (μm). The best pixel size thereof is smaller than 0.9 micrometers (μm). Furthermore, the optical image capturing system is applicable to the image sensing device with aspect ratio of 16:9.

The optical image capturing system described above is applicable to the demand of video recording with above millions or ten millions-pixels (e.g. 4K2K or called UHD, QHD) and leads to a good imaging quality.

The height of optical system (HOS) may be reduced to achieve the minimization of the optical image capturing system when the absolute value of f1 is larger than f4 ($|f1|>f4$).

When $|f2|+|f3|>|f1|+|f4|$, at least one of the second through third lens elements may have weak positive refractive power or weak negative refractive power. The weak refractive power indicates that an absolute value of the focal length of a specific lens element is greater than 10. When at least one of the second through third lens elements has the weak positive refractive power, the positive refractive power of the first lens element can be shared, such that the unnecessary aberration will not appear too early. On the contrary, when at least one of the second through third lens elements has the weak negative refractive power, the aberration of the optical image capturing system can be corrected and fine tuned.

The fourth lens element may have negative refractive power and a concave image-side surface. Hereby, the back focal length is reduced for keeping the miniaturization, to miniaturize the lens element effectively. In addition, at least one of the object-side surface and the image-side surface of the fourth lens element may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
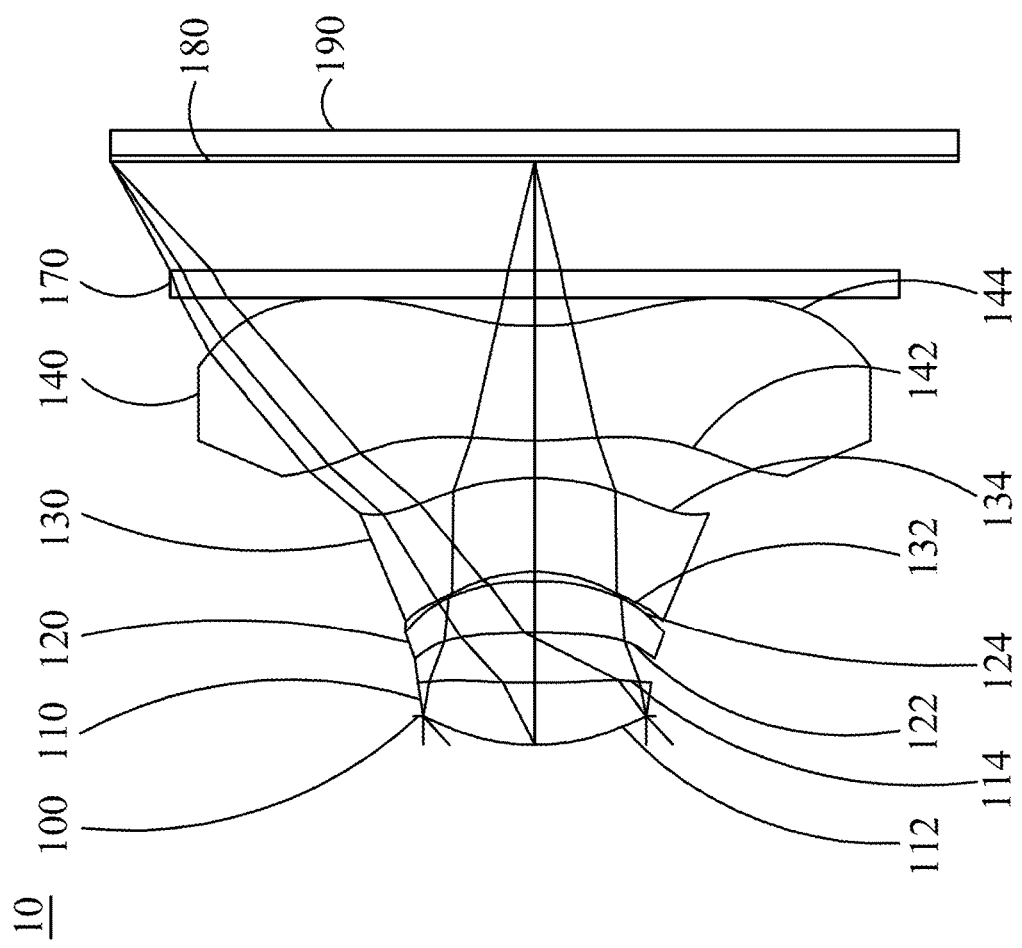
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first, second, third and fourth lens elements with refractive power. The optical image capturing system may further include an image sensing device which is disposed on an image plane.

The optical image capturing system may use three sets of wavelengths which are 486.1 nm, 587.5 nm and 656.2 nm, respectively, wherein 587.5 nm is served as the primary reference wavelength and a reference wavelength for retrieving technical features. The optical image capturing system may also use five sets of wavelengths which are 470 nm, 510 nm, 555 nm, 610 nm and 650 nm, respectively, wherein 555 nm is served as the primary reference wavelength and a reference wavelength for retrieving technical features.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: 0.5≤ΣPPR/|ΣNPR|≤4.5. Preferably, the following relation may be satisfied: 1≤|ΣPPR/ΣNPR|≤3.5.

The height of the optical image capturing system is HOS. It will facilitate the manufacturing of miniaturized optical image capturing system which may form images with ultra high pixels when the specific ratio value of HOS/f tends to 1.

A sum of a focal length fp of each lens element with positive refractive power is ΣPP. A sum of a focal length fn of each lens element with negative refractive power is ENP. In one embodiment of the optical image capturing system of the present disclosure, the following relations are satisfied: 0<ΣPP≤200 and f1/ΣPP≤0.85. Preferably, the following relations may be satisfied: 0<ΣPP≤150 and 0.01≤f1/ΣPP≤0.7. Hereby, its beneficial to control the focus ability of the optical image capturing system and allocate the positive refractive power of the optical image capturing system appropriately, so as to suppress the significant aberration generating too early.

The first lens element may have positive refractive power, and it has a convex object-side surface. Hereby, strength of the positive refractive power of the first lens element can be fined-tuned, so as to reduce the total length of the optical image capturing system.

The second lens element may have negative refractive power. Hereby, the aberration generated by the first lens element can be corrected.

The third lens element may have positive refractive power. Hereby, the positive refractive power of the first lens element can be shared.

The fourth lens element may have negative refractive power and a concave image-side surface. Hereby, the back focal length is reduced for keeping the miniaturization, to miniaturize the lens element effectively. In addition, at least one of the object-side surface and the image-side surface of the fourth lens element may have at least one inflection point, such that the angle of incident with incoming light from an off-axis field of view can be suppressed effectively and the aberration in the off-axis field of view can be corrected further. Preferably, each of the object-side surface and the image-side surface may have at least one inflection point.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following relations are satisfied: HOS/HOI≤3 and 0.5≤HOS/f≤3.0. Preferably, the following relations may be satisfied: 1≤HOS/HOI≤2.5 and 1≤HOS/f≤2. Hereby, the miniaturization of the optical image capturing system can be maintained effectively, so as to be carried by lightweight portable electronic devices.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: 0.5≤InS/HOS≤1.1. Preferably, the following relation may be satisfied: 0.8≤InS/HOS≤1. Hereby, features of maintaining the minimization for the optical image capturing system and having wide-angle are available simultaneously.

In the optical image capturing system of the disclosure, a distance from the object-side surface of the first lens element to the image-side surface of the fourth lens element is InTL. A sum of central thicknesses of all lens elements with refractive power on the optical axis is ΣTP. The following relation is satisfied: 0.45≤ΣTP/InTL≤0.95. Preferably, the following relation may be satisfied: 0.6≤ΣTP/InTL≤0.9. Hereby, contrast ratio for the image formation in the optical image capturing system and defect-free rate for manufacturing the lens element can be given consideration simultaneously, and a proper back focal length is provided to dispose other optical components in the optical image capturing system.

A curvature radius of the object-side surface of the first lens element is R1. A curvature radius of the image-side surface of the first lens element is R2. The following relation is satisfied: 0.01≤|R1/R2|≤0.5. Hereby, the first lens element may have proper strength of the positive refractive power, so as to avoid the longitudinal spherical aberration to increase too fast. Preferably, the following relation may be satisfied: 0.01≤|R1/R2|≤0.4.

A curvature radius of the object-side surface of the fourth lens element is R9. A curvature radius of the image-side surface of the fourth lens element is R10. The following relation is satisfied: −200<(R7−R8)/(R7+R8)<30. Hereby, the astigmatism generated by the optical image capturing system can be corrected beneficially.

A distance between the first lens element and the second lens element on the optical axis is IN12. The following relation is satisfied: 0<IN12/f≤0.25. Preferably, the following relation may be satisfied: 0.01≤IN12/f≤0.20. Hereby, the chromatic aberration of the lens elements can be improved, such that the performance can be increased.

A distance between the second lens element and the third lens element on the optical axis is IN23. The following relation is satisfied: 0<IN23/f≤0.25. Preferably, the following relation may be satisfied: 0.01≤IN23/f≤0.20. Hereby, the performance of the lens elements can be improved.

A distance between the third lens element and the fourth lens element on the optical axis is IN34. The following relation is satisfied: 0<IN34/f≤0.25. Preferably, the following relation may be satisfied: 0.001≤IN34/f≤0.20. Hereby, the performance of the lens elements can be improved.

Central thicknesses of the first lens element and the second lens element on the optical axis are TP1 and TP2, respectively. The following relation is satisfied: 1≤(TP1+IN12)/TP2≤10. Hereby, the sensitivity produced by the optical image capturing system can be controlled, and the performance can be increased.

Central thicknesses of the third lens element and the fourth lens element on the optical axis are TP3 and TP4, respectively, and a distance between the aforementioned two lens elements on the optical axis is IN34. The following relation is satisfied: 0.2≤(TP4+IN34)/TP4≤3. Hereby, the sensitivity produced by the optical image capturing system can be controlled and the total height of the optical image capturing system can be reduced.

A distance between the second lens element and the third lens element on the optical axis is IN23. A total sum of distances from the first lens element to the fourth lens element on the optical axis is ΣTP. The following relation is satisfied: 0.01≤IN23/(TP2+IN23+TP3)≤0.5. Preferably, the following relation may be satisfied: 0.05≤IN23/(TP2+IN23+TP3)≤0.4. Hereby, the aberration generated by the process of moving the incident light can be adjusted slightly layer upon layer, and the total height of the optical image capturing system can be reduced.

In the optical image capturing system of the disclosure, a distance in parallel with an optical axis from a maximum effective diameter position to an axial point on the object-side surface 142 of the fourth lens element is InRS41 (InRS41 is positive if the horizontal displacement is toward the image-side surface, or InRS41 is negative if the horizontal displacement is toward the object-side surface). A distance in parallel with an optical axis from a maximum effective diameter position to an axial point on the image-side surface 144 of the fourth lens element is InRS42. A central thickness of the fourth lens element 140 on the optical axis is TP4. The following relations are satisfied: −1 mm≤InRS4|≤1 mm, −1 mm≤InRS42≤1 mm, 1 mm≤|InRS41|+|InRS42|≤2 mm, 0.01≤|InRS41|/TP4≤10 and 0.01≤|InRS42|/TP4≤10. Hereby, the maximum effective diameter position between both surfaces of the fourth lens element can be controlled, so as to facilitate the aberration correction of peripheral field of view of the optical image capturing system and maintain its miniaturization effectively.

In the optical image capturing system of the disclosure, a distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following relations are satisfied: 0<SGI411/(SGI411+TP4)≤0.9 and 0<SGI421/(SGI421+TP4)≤0.9. Preferably, the following relations may be satisfied: 0.01<SGI411/(SGI411+TP4)≤0.7 and 0.01<SGI421/(SGI421+TP4)≤0.7.

A distance in parallel with the optical axis from the inflection point on the object-side surface of the fourth lens element which is the second nearest to the optical axis to an axial point on the object-side surface of the fourth lens element is denoted by SGI412. A distance in parallel with an optical axis from an inflection point on the image-side surface of the fourth lens element which is the second nearest to the optical axis to an axial point on the image-side surface of the fourth lens element is denoted by SGI422. The following relations are satisfied: 0<SGI412/(SGI412+TP4)≤0.9 and 0<SGI422/(SGI422+TP4)≤0.9. Preferably, the following relations may be satisfied: 0.1≤SGI412/(SGI412+TP4)≤0.8 and 0.1≤SGI422/(SGI422+TP4)≤0.8.

A distance perpendicular to the optical axis between the inflection point on the object-side surface of the fourth lens element which is nearest to the optical axis and the optical axis is denoted by HIF411. A distance perpendicular to the optical axis between an inflection point on the image-side surface of the fourth lens element which is nearest to the optical axis and an axial point on the image-side surface of the fourth lens element is denoted by HIF421. The following relations are satisfied: 0.01≤HIF411/HOI≤0.9 and 0.01≤HIF421/HOI≤0.9. Preferably, the following relations may be satisfied: 0.09≤HIF411/HOI≤0.5 and 0.09≤HIF421/HOI≤0.5.

A distance perpendicular to the optical axis between the inflection point on the object-side surface of the fourth lens element which is the second nearest to the optical axis and the optical axis is denoted by HIF412. A distance perpendicular to the optical axis between an axial point on the image-side surface of the fourth lens element and an inflection point on the image-side surface of the fourth lens element which is the second nearest to the optical axis is denoted by HIF422. The following relations are satisfied: 0.01≤HIF412/HOI≤0.9 and 0.01≤HIF422/HOI≤0.9. Preferably, the following relations may be satisfied: 0.09≤HIF412/HOI≤0.8 and 0.09≤HIF422/HOI≤0.8.

A distance perpendicular to the optical axis between the inflection point on the object-side surface of the fourth lens element which is the third nearest to the optical axis and the optical axis is denoted by HIF413. A distance perpendicular to the optical axis between an axial point on the image-side surface of the fourth lens element and an inflection point on the image-side surface of the fourth lens element which is the third nearest to the optical axis is denoted by HIF423. The following relations are satisfied: 0.001 mm≤|HIF413|≤5 mm and 0.001 mm≤|HIF423|≤5 mm. Preferably, the following relations may be satisfied: 0.1 mm≤|HIF423|≤3.5 mm and 0.1 mm≤|HIF413|≤3.5 mm.

A distance perpendicular to the optical axis between the inflection point on the object-side surface of the fourth lens element which is the fourth nearest to the optical axis and the optical axis is denoted by HIF414. A distance perpendicular to the optical axis between an axial point on the image-side surface of the fourth lens element and an inflection point on the image-side surface of the fourth lens element which is the fourth nearest to the optical axis is denoted by HIF424. The following relations are satisfied: 0.001 mm≤|HIF414|≤5 mm and 0.001 mm≤|HIF424|≤5 mm. Preferably, the following relations may be satisfied: 0.1 mm≤|HIF424|≤3.5 mm and 0.1 mm≤|HIF414|≤3.5 mm.

In one embodiment of the optical image capturing system of the present disclosure, the chromatic aberration of the optical image capturing system can be corrected by alternatively arranging the lens elements with large Abbe number and small Abbe number.

The above Aspheric formula is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \qquad (1),$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through fourth lens elements may be aspheric, so as to obtain more control variables. Comparing with the usage of traditional lens element made by glass, the number of lens elements used can be reduced and the aberration can be eliminated. Thus, the total height of the optical image capturing system can be reduced effectively.

In addition, in the optical image capturing system provided by the disclosure, if the lens element has a convex surface, the surface of the lens element is convex adjacent to the optical axis. If the lens element has a concave surface, the surface of the lens element is concave adjacent to the optical axis.

Besides, in the optical image capturing system of the disclosure, according to different requirements, at least one aperture may be arranged for reducing stray light and improving the imaging quality.

The optical image capturing system of the disclosure can be adapted to the optical image capturing system with automatic focus if required. With the features of a good aberration correction and a high quality of image formation, the optical image capturing system can be used in various application fields.

The optical image capturing system of the disclosure can include a driving module according to the actual requirements. The driving module may be coupled with the lens elements to enable the lens elements producing displacement. The driving module described above may be the voice coil motor (VCM) which is applied to move the lens to focus, or may be the optical image stabilization (OIS) which is applied to reduce the distortion frequency owing to the vibration of the lens while shooting.

According to the above embodiments, the specific embodiments with figures are presented in detail as below.

The First Embodiment (Embodiment 1)

Figure 1B:
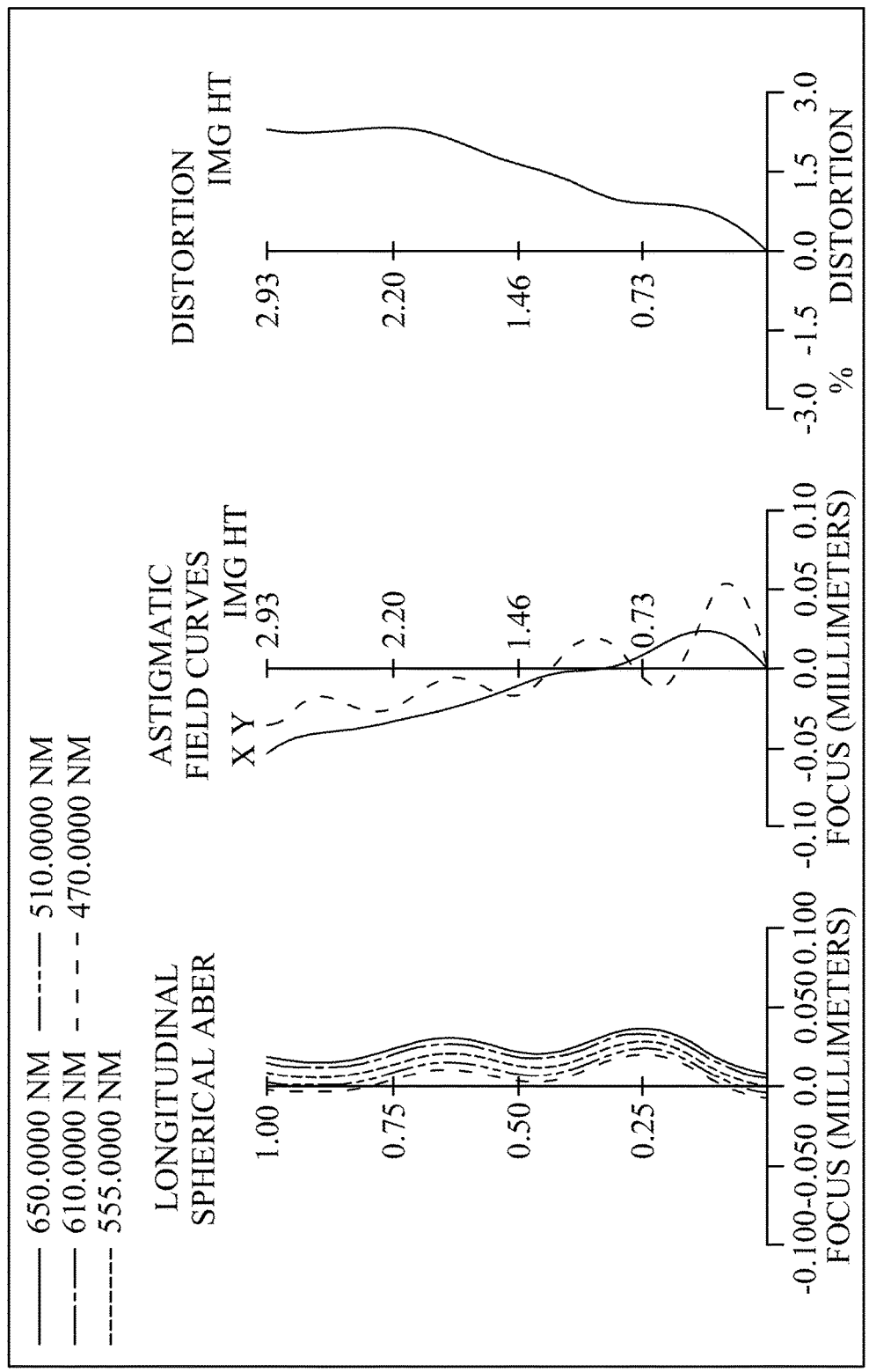
FIG. 1B is longitudinal spherical aberration curves, astigmatic field curves, and an optical distortion grid of the optical image capturing system in the order from left to right according to the first embodiment of the present application.
Figure 1C:
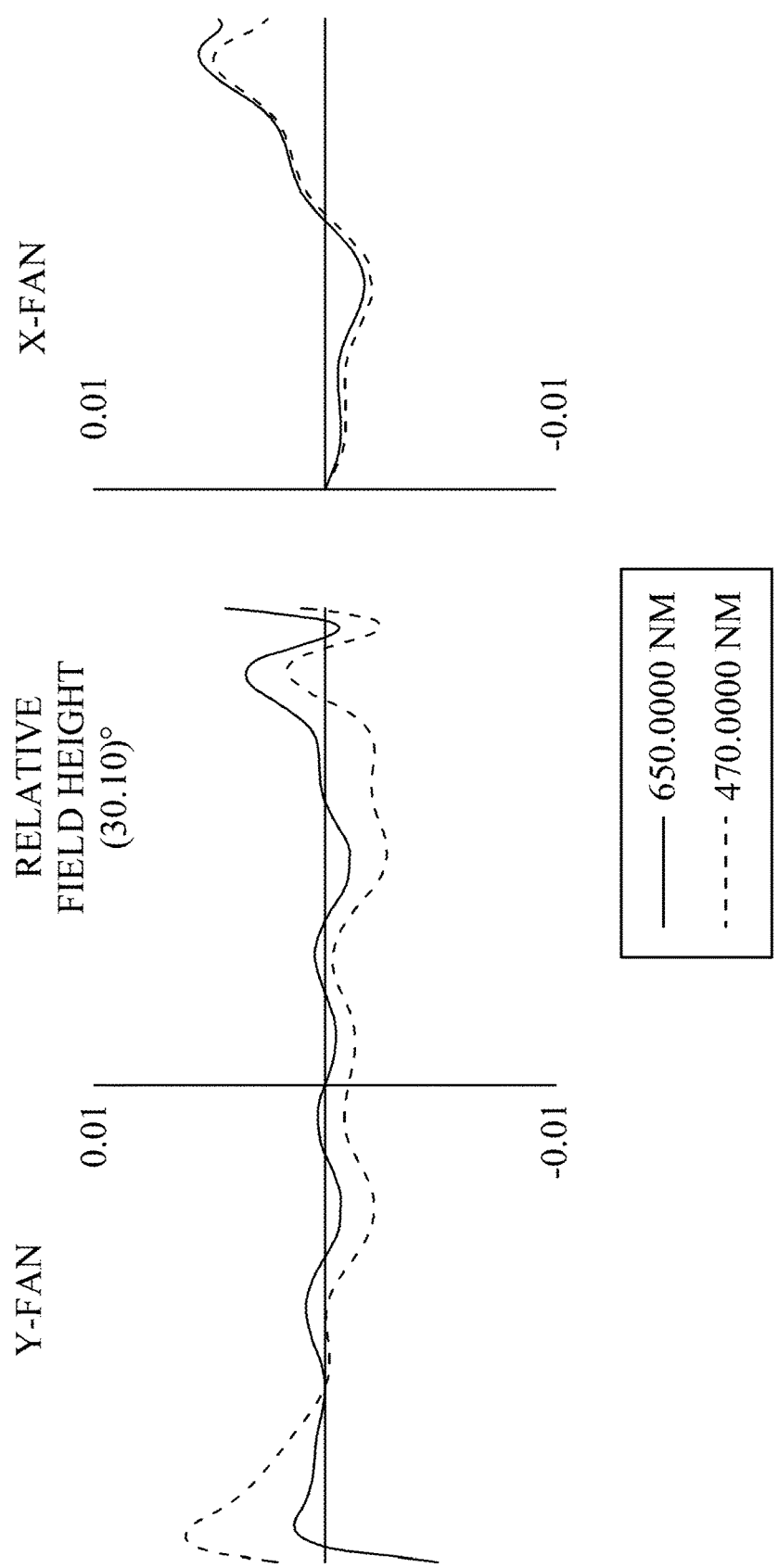
FIG. 1C is a lateral aberration diagram of tangential fan, sagittal fan, the longest operation wavelength and the shortest operation wavelength passing through an edge of the entrance pupil and incident on the image plane by 0.7 HOI according to the first embodiment of the present application.

Please refer to FIG. 1A and FIG. 1B. FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a lateral aberration diagram of tangential fan, sagittal fan, the longest operation wavelength and the shortest operation wavelength passing through an edge of the entrance pupil and incident on the image plane by 0.7 HOI according to the first embodiment of the present application. As shown in FIG. 1A, in order from an object side to an image side, the optical image capturing system includes an aperture stop 1, a first lens element 110, a second lens element 120, a third lens element 130, a fourth lens element 140, an IR-bandstop filter 170, an image plane 180, and an image sensing device 190.

The first lens element 110 has positive refractive power and it is made of plastic material. The first lens element 110 has a convex object-side surface 112 and a concave image-side surface 114, both of the object-side surface 112 and the image-side surface 114 are aspheric. The object-side surface 112 and the image-side surface 114 have an inflection point respectively. The length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of a half of an entrance pupil diameter (HEP) of the object-side surface of the first lens element is denoted as ARE11, and the length of outline curve of the half of the entrance pupil diameter (HEP) of the image-side surface of the first lens element is denoted as ARE12. The thickness of the first lens element on the optical axis is TP1.

A distance in parallel with an optical axis from an inflection point on the object-side surface of the first lens element which is nearest to the optical axis to an axial point on the object-side surface of the first lens element is denoted by SGI111. A distance in parallel with an optical axis from an inflection point on the image-side surface of the first lens element which is nearest to the optical axis to an axial point on the image-side surface of the first lens element is denoted by SGI121. The following relations are satisfied: SGI111=0.2008 mm, SGI121=0.0113 mm, |SGI111|/(|SGI111|+TP1)=0.3018 and |SGI121|/(|SGI121|+TP1)=0.0238°.

A distance perpendicular to the optical axis from the inflection point on the object-side surface of the first lens element which is nearest to the optical axis to an axial point on the object-side surface of the first lens element is denoted by HIF111. A distance perpendicular to the optical axis from the inflection point on the image-side surface of the first lens element which is nearest to the optical axis to an axial point on the image-side surface of the first lens element is denoted by HIF121. The following relations are satisfied: HIF111=0.7488 mm, HIF121=0.4451 mm, HIF111/HOI=0.2552 and HIF121/HOI=0.1517.

The second lens element 120 has positive refractive power and it is made of plastic material. The second lens element 120 has a concave object-side surface 122 and a convex image-side surface 124, and both of the object-side surface 122 and the image-side surface 124 are aspheric. The object-side surface 122 has an inflection point. The length of outline curve of the maximum effective half diameter position of the object-side surface of the second lens element is denoted as ARS21, and the length of outline curve of the maximum effective half diameter position of the image-side surface of the second lens element is denoted as ARS22. The length of outline curve of a half of an entrance pupil diameter (HEP) of the object-side surface of the second lens element is denoted as ARE21, and the length of outline curve of the half of the entrance pupil diameter (HEP) of the image-side surface of the second lens element is denoted as ARS22. The thickness of the second lens element on the optical axis is TP2.

A distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221. The following relations are satisfied: SGI211=−0.1791 mm and |SGI211|/(|SGI211|+TP2)=0.3109.

A distance perpendicular to the optical axis from the inflection point on the object-side surface of the second lens element which is nearest to the optical axis to an axial point on the object-side surface of the second lens element is denoted by HIF211. A distance perpendicular to the optical axis from the inflection point on the image-side surface of the second lens element which is nearest to the optical axis to an axial point on the image-side surface of the second lens element is denoted by HIF221. The following relations are satisfied: HIF211=0.8147 mm and HIF211/HOI=0.2777.

The third lens element 130 has negative refractive power and it is made of plastic material. The third lens element 130 has a concave object-side surface 132 and a convex image-side surface 134, and both of the object-side surface 132 and the image-side surface 134 are aspheric. The image-side surface 134 has an inflection point. The length of outline curve of the maximum effective half diameter position of the object-side surface of the third lens element is denoted as ARS31, and the length of outline curve of the maximum effective half diameter position of the image-side surface of the third lens element is denoted as ARS32. The length of outline curve of a half of an entrance pupil diameter (HEP) of the object-side surface of the third lens element is denoted as ARE31, and the length of outline curve of the half of the entrance pupil diameter (HEP) of the image-side surface of the third lens element is denoted as ARS32. The thickness of the third lens element on the optical axis is TP3.

A distance in parallel with an optical axis from an inflection point on the object-side surface of the third lens element which is nearest to the optical axis to an axial point on the object-side surface of the third lens element is denoted by SGI311. A distance in parallel with an optical axis from an inflection point on the image-side surface of the third lens element which is nearest to the optical axis to an axial point on the image-side surface of the third lens element is denoted by SGI321. The following relations are satisfied: SGI321=−0.1647 mm and |SGI321|/(|SGI321|+TP3)=0.1884.

A distance perpendicular to the optical axis between the inflection point on the object-side surface of the third lens element which is nearest to the optical axis and the optical axis is denoted by HIF311. A distance perpendicular to the optical axis from the inflection point on the image-side surface of the third lens element which is nearest to the optical axis to an axial point on the image-side surface of the third lens element is denoted by HIF321. The following relations are satisfied: HIF321=0.7269 mm and HIF321/HOI=0.2477.

The fourth lens element 140 has negative refractive power and it is made of plastic material. The fourth lens element 140 has a convex object-side surface 142 and a concave image-side surface 144, both of the object-side surface 142 and the image-side surface 144 are aspheric, the object-side surface 142 has two inflection points and the image-side surface 144 has an inflection point. The length of outline curve of the maximum effective half diameter position of the object-side surface of the fourth lens element is denoted as ARS41, and the length of outline curve of the maximum effective half diameter position of the image-side surface of the fourth lens element is denoted as ARS42. The length of outline curve of a half of an entrance pupil diameter (HEP) of the object-side surface of the fourth lens element is denoted as ARE41, and the length of outline curve of the half of the entrance pupil diameter (HEP) of the image-side surface of the fourth lens element is denoted as ARS42. The thickness of the fourth lens element on the optical axis is TP4.

A distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following relations are satisfied: SGI411=0.0137 mm, SGI421=0.0922 mm, |SGI411|/(|SGI411|+TP4)=0.0155 and |SGI421|/(|SGI421|+TP4)=0.0956.

A distance in parallel with the optical axis from an inflection point on the object-side surface of the fourth lens element which is the second nearest to the optical axis to an axial point on the object-side surface of the fourth lens element is denoted by SGI412. The following relations are satisfied: SGI412=−0.1518 mm and |SGI412|/(|SGI412|+TP4)=0.1482.

A distance perpendicular to the optical axis between the inflection point on the object-side surface of the fourth lens element which is nearest to the optical axis and the optical axis is denoted by HIF411. A distance perpendicular to the optical axis between the inflection point on the image-side surface of the fourth lens element which is nearest to the optical axis and the optical axis is denoted by HIF421. The following relations are satisfied: HIF411=0.2890 mm, HIF421=0.5794 mm, HIF411/HOI=0.0985 and HIF421/HOI=0.1975.

A distance perpendicular to the optical axis between the inflection point on the object-side surface of the fourth lens element which is the second nearest to the optical axis and the optical axis is denoted by HIF412. The following relations are satisfied: HIF412=1.3328 mm and HIF412/HOI=0.4543.

The IR-bandstop filter 170 is made of glass material without affecting the focal length of the optical image capturing system and it is disposed between the fourth lens element 140 and the image plane 180.

In the optical image capturing system of the first embodiment, a focal length of the optical image capturing system is f, an entrance pupil diameter of the optical image capturing system is HEP, and half of a maximal view angle of the optical image capturing system is HAF. The detailed parameters are shown as below: f=3.4375 mm, f/HEP=2.23, HAF=39.69° and tan(HAF)=0.8299.

In the optical image capturing system of the first embodiment, a focal length of the first lens element 110 is f1 and a focal length of the fourth lens element 140 is f4. The following relations are satisfied: f1=3.2736 mm, |f/f1|=1.0501, f4=−8.3381 mm and |f1/f4|=0.3926.

In the optical image capturing system of the first embodiment, focal lengths of the second lens element 120 and the third lens element 130 are f2 and f3, respectively. The following relations are satisfied: |f2|+|f3|=10.0976 mm, |f1|+|f4|=11.6116 mm and |f2|+|f3|<|f1|+|f4|.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. In the optical image capturing system of the first embodiment, a sum of the PPR of all lens elements with positive refractive power is ΣPPR=|f/f1|+|f/f2|=1.95585. A sum of the NPR of all lens elements with negative refractive powers is $\Sigma NPR=|f/f3|+|f/f4|=0.95770$ and $\Sigma PPR/|\Sigma NPR|=2.04224$. The following relations are also satisfied: $|f/f1|=1.05009$, $|f/f2|=0.90576$, $|f/f3|=0.54543$ and $|f/f4|=0.41227$.

In the optical image capturing system of the first embodiment, a distance from the object-side surface 112 of the first lens element to the image-side surface 144 of the fourth lens element is InTL. A distance from the object-side surface 112 of the first lens element to the image plane 180 is HOS. A distance from an aperture 100 to an image plane 180 is InS. Half of a diagonal length of an effective detection field of the image sensing device 190 is HOI. A distance from the image-side surface 144 of the fourth lens element to an image plane 180 is InB. The following relations are satisfied: InTL+InB=HOS, HOS=4.4250 mm, HOI=2.9340 mm, HOS/HOI=1.5082, HOS/f=1.2873, InTL/HOS=0.7191, InS=4.2128 mm and InS/HOS=0.95204.

In the optical image capturing system of the first embodiment, the sum of central thicknesses of all lens elements with refractive power on the optical axis is $\Sigma TP$. The following relations are satisfied: $\Sigma TP=2.4437$ mm and $\Sigma TP/InTL=0.76793$. Hereby, contrast ratio for the image formation in the optical image capturing system and defect-free rate for manufacturing the lens element can be given consideration simultaneously, and a proper back focal length is provided to dispose other optical components in the optical image capturing system.

In the optical image capturing system of the first embodiment, a curvature radius of the object-side surface 112 of the first lens element is R1. A curvature radius of the image-side surface 114 of the first lens element is R2. The following relation is satisfied: $|R1/R2|=0.1853$. Hereby, the first lens element may have proper strength of the positive refractive power, so as to avoid the longitudinal spherical aberration to increase too fast.

In the optical image capturing system of the first embodiment, a curvature radius of the object-side surface 142 of the fourth lens element is R7. A curvature radius of the image-side surface 144 of the fourth lens element is R8. The following relation is satisfied: $(R7-R8)/(R7+R8)=0.2756$. Hereby, the astigmatism generated by the optical image capturing system can be corrected beneficially.

In the optical image capturing system of the first embodiment, the focal lengths of the first lens element 110 and the second lens element 120 are f1 and f2, respectively. A sum of focal lengths of all lens elements with positive refractive power is $\Sigma PP$. The following relations are satisfied: $\Sigma PP=f1+f2=7.0688$ mm and $f1/(f1+f2)=0.4631$. Hereby, it is favorable for allocating the positive refractive power of the first lens element 110 to other positive lens elements and the significant aberrations generated in the process of moving the incident light can be suppressed.

In the optical image capturing system of the first embodiment, the focal lengths of the third lens element 130 and the fourth lens element 140 are f3 and f4, respectively. A sum of focal lengths of all lens elements with negative refractive power is $\Sigma NP$. The following relations are satisfied: $\Sigma NP=f3+f4=-14.6405$ mm and $f4/(f3+f4)=0.5695$. Hereby, it is favorable for allocating the negative refractive power of the fourth lens element 140 to other negative lens elements and the significant aberrations generated in the process of moving the incident light can be suppressed.

In the optical image capturing system of the first embodiment, a distance between the first lens element 110 and the second lens element 120 on the optical axis is IN12. The following relations are satisfied: IN12=0.3817 mm and IN12/f=0.11105. Hereby, the chromatic aberration of the lens elements can be improved, such that the performance can be increased.

In the optical image capturing system of the first embodiment, a distance between the second lens element 120 and the third lens element 130 on the optical axis is IN23. The following relations are satisfied: IN23=0.0704 mm and IN23/f=0.02048. Hereby, the chromatic aberration of the lens elements can be improved, such that the performance can be increased.

In the optical image capturing system of the first embodiment, a distance between the third lens element 130 and the fourth lens element 140 on the optical axis is IN34. The following relations are satisfied: IN34=0.2863 mm and IN34/f=0.08330. Hereby, the chromatic aberration of the lens elements can be improved, such that the performance can be increased.

In the optical image capturing system of the first embodiment, central thicknesses of the first lens element 110 and the second lens element 120 on the optical axis are TP1 and TP2, respectively. The following relations are satisfied: TP1=0.46442 mm, TP2=0.39686 mm, TP1/TP2=1.17023 and (TP1+IN12)/TP2=2.13213. Hereby, the sensitivity produced by the optical image capturing system can be controlled, and the performance can be increased.

In the optical image capturing system of the first embodiment, central thicknesses of the third lens element 130 and the fourth lens element 140 on the optical axis are TP3 and TP4, respectively, and a distance between the aforementioned two lens elements on the optical axis is IN34. The following relations are satisfied: TP3=0.70989 mm, TP4=0.87253 mm, TP3/TP4=0.81359 and (TP4+IN34)/TP3=1.63248. Hereby, the sensitivity produced by the optical image capturing system can be controlled and the total height of the optical image capturing system can be reduced.

In the optical image capturing system of the first embodiment, the following relations are satisfied: IN23/(TP2+IN23+TP3)=0.05980. Hereby, the aberration generated by the process of moving the incident light can be adjusted slightly layer upon layer, and the total height of the optical image capturing system can be reduced.

A distance in parallel with an optical axis from a maximum effective diameter position to an axial point on the object-side surface 142 of the fourth lens element is InRS41. A distance in parallel with an optical axis from a maximum effective diameter position to an axial point on the image-side surface 144 of the fourth lens element is InRS42. A central thickness of the fourth lens element 140 on the optical axis is TP4. The following relations are satisfied: InRS41=−0.23761 mm, InRS42=−0.20206 mm, |InRS41|+|InRS42|=0.43967 mm, |InRS41|/TP4=0.27232 and |InRS42|/TP4=0.23158. Hereby, it is favorable to the manufacturing and formation of the lens elements and to maintain its miniaturization effectively.

In the optical image capturing system of the first embodiment, a distance perpendicular to the optical axis between a critical point C41 on the object-side surface 142 of the fourth lens element and the optical axis is HVT41. A distance perpendicular to the optical axis between a critical point C42 on the image-side surface 144 of the fourth lens element and the optical axis is HVT42. The following relations are satisfied: HVT41=0.5695 mm, HVT42=1.3556 mm and HVT41/HVT42=0.4201. Hereby, the aberration in the off-axis field of view can be corrected.

In the optical image capturing system of the first embodiment, the following relation is satisfied: HVT42/HOI=0.4620. Hereby, the aberration of surrounding field of view can be corrected.

In the optical image capturing system of the first embodiment, the following relation is satisfied: HVT42/HOS=0.3063. Hereby, the aberration of surrounding field of view can be corrected.

In the optical image capturing system of the first embodiment, an Abbe number of the first lens element is NA1. An Abbe number of the second lens element is NA2. An Abbe number of the third lens element is NA3. An Abbe number of the fourth lens element is NA4. The following relations are satisfied: |NA1−NA2|=0 and NA3/NA2=0.39921. Hereby, the chromatic aberration of the optical image capturing system can be corrected.

In the optical image capturing system of the first embodiment, TV distortion and optical distortion for image formation in the optical image capturing system are TDT and ODT, respectively. The following relations are satisfied: |TDT|=0.4% and |ODT|=2.5%.

In the optical image capturing system of the first embodiment, a lateral aberration of the longest operation wavelength of a positive direction tangential fan of the optical image capturing system passing through an edge of the aperture and incident on the image plane by 0.7 view field is denoted as PLTA, which is 0.001 mm (pixel size is 1.12 µm). A lateral aberration of the shortest operation wavelength of the positive direction tangential fan of the optical image capturing system passing through the edge of the aperture and incident on the image plane by 0.7 view field is denoted as PSTA, which is 0.004 mm (pixel size is 1.12 µm). A lateral aberration of the longest operation wavelength of a negative direction tangential fan of the optical image capturing system passing through the edge of the aperture and incident on the image plane by 0.7 view field is denoted as NLTA, which is 0.003 mm (pixel size is 1.12 µm). A lateral aberration of the shortest operation wavelength of a negative direction tangential fan of the optical image capturing system passing through the edge of the aperture and incident on the image plane by 0.7 view field is denoted as NSTA, which is −0.003 mm (pixel size is 1.12 µm). A lateral aberration of the longest operation wavelength of a sagittal fan of the optical image capturing system passing through the edge of the aperture and incident on the image plane by 0.7 view field is denoted as SLTA, which is 0.003 mm (pixel size is 1.12 µm). A lateral aberration of the shortest operation wavelength of the sagittal fan of the optical image capturing system passing through the edge of the aperture and incident on the image plane by 0.7 view field is denoted as SSTA, which is 0.004 mm (pixel size is 1.12 µm).

Please refer to the following Table 1 and Table 2.

The detailed data of the optical image capturing system of the first embodiment is as shown in Table 1.

TABLE 1

Data of the optical image capturing system
f = 3.4375 mm, f/HEP = 2.23, HAF = 39.6900 deg; tan(HAF) = 0.8299

| Surface # | | Curvature Radius | Thickness | Material | Index | Abbe # | Focal length |
|---|---|---|---|---|---|---|---|
| 0 | Object | Plano | | At infinity | | | |
| 1 | Lens 1/Ape. stop | 1.466388 | 0.464000 | Plastic | 1.535 | 56.07 | 3.274 |
| 2 | | 7.914480 | 0.382000 | | | | |
| 3 | Lens 2 | −5.940659 | 0.397000 | Plastic | 1.535 | 56.07 | 3.795 |
| 4 | | −1.551401 | 0.070000 | | | | |
| 5 | Lens 3 | −0.994576 | 0.710000 | Plastic | 1.642 | 22.46 | −6.302 |
| 6 | | −1.683933 | 0.286000 | | | | |
| 7 | Lens 4 | 2.406736 | 0.873000 | Plastic | 1.535 | 56.07 | −8.338 |
| 8 | | 1.366640 | 0.213000 | | | | |
| 9 | IR-bandstop filter | Plano | 0.210000 | BK7_SCHOTT | 1.517 | 64.13 | |
| 10 | | Plano | 0.820000 | | | | |
| 11 | Image plane | Plano | | | | | |

Reference wavelength = 555 nm; shield position: clear aperture (CA) of the eighth plano = 2.320 mm.

As for the parameters of the aspheric surfaces of the first embodiment, reference is made to Table 2.

TABLE 2

Aspheric Coefficients

| | Surface # | | | | | |
|---|---|---|---|---|---|---|
| | 1 | 2 | 3 | 4 | 5 | 6 |
| k = | −1.595426E+00 | −7.056632E+00 | −2.820679E+01 | −1.885740E+00 | 1.013988E−01 | −3.460337E+01 |
| A4 = | −4.325520E−04 | −2.633963E−02 | −1.367865E−01 | −9.745260E−02 | 2.504976E−01 | −9.580611E−01 |
| A6 = | 1.103749E+00 | 2.088207E−02 | 3.135755E−01 | −1.032177E+00 | −1.640463E+00 | 3.303418E+00 |
| A8 = | −8.796867E+00 | −1.122861E−01 | −6.149514E+00 | 8.016230E+00 | 1.354700E+01 | −8.544412E+00 |
| A10 = | 3.981982E+01 | −7.137813E−01 | 3.883332E+01 | −4.215882E+01 | −6.223343E+01 | 1.602487E+01 |
| A12 = | −1.102573E+02 | 2.236312E+00 | −1.463622E+02 | 1.282874E+02 | 1.757259E+02 | −2.036011E+01 |
| A14 = | 1.900642E+02 | −2.756305E+00 | 3.339863E+02 | −2.229568E+02 | −2.959459E+02 | 1.703516E+01 |
| A16 = | −2.000279E+02 | 1.557080E+00 | −4.566510E+02 | 2.185571E+02 | 2.891641E+02 | −8.966359E+00 |
| A18 = | 1.179848E+02 | −2.060190E+00 | 3.436469E+02 | −1.124538E+02 | −1.509364E+02 | 2.684766E+00 |

TABLE 2-continued

| Aspheric Coefficients | | | | | |
|---|---|---|---|---|---|
| A20 = | −3.023405E+01 | 2.029630E+00 | −1.084572E+02 | 2.357571E+01 | 3.243879E+01 | −3.481557E−01 |

| | Surface # | |
|---|---|---|
| | 7 | 8 |
| k = | −4.860907E+01 | −7.091499E+00 |
| A4 = | −2.043197E−01 | −8.148585E−02 |
| A6 = | 6.516636E−02 | 3.050566E−02 |
| A8 = | 4.863926E−02 | −8.218175E−03 |
| A10 = | −7.086809E−02 | 1.186528E−03 |
| A12 = | 3.815824E−02 | −1.305021E−04 |
| A14 = | −1.032930E−02 | 2.886943E−05 |
| A16 = | 1.413303E−03 | −6.459004E−06 |
| A18 = | −8.701682E−05 | 6.571792E−07 |
| A20 = | 1.566415E−06 | −2.325503E−08 |

The relevant data of the length of outline curve may be deduced from Table 1 and Table 2.

| First embodiment (Primary reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.771 | 0.808 | 0.037 | 104.77% | 0.464 | 173.90% |
| 12 | 0.771 | 0.771 | 0.000 | 99.99% | 0.464 | 165.97% |
| 21 | 0.771 | 0.797 | 0.026 | 103.38% | 0.397 | 200.80% |
| 22 | 0.771 | 0.828 | 0.057 | 107.37% | 0.397 | 208.55% |
| 31 | 0.771 | 0.832 | 0.061 | 107.97% | 0.710 | 117.25% |
| 32 | 0.771 | 0.797 | 0.026 | 103.43% | 0.710 | 112.32% |
| 41 | 0.771 | 0.771 | 0.000 | 100.05% | 0.873 | 88.39% |
| 42 | 0.771 | 0.784 | 0.013 | 101.69% | 0.873 | 89.84% |

| ARS | EHD | ARS value | ARS − EHD | (ARS/EHD) % | TP | ARS/TP (%) |
|---|---|---|---|---|---|---|
| 11 | 0.771 | 0.808 | 0.037 | 104.77% | 0.464 | 173.90% |
| 12 | 0.812 | 0.814 | 0.002 | 100.19% | 0.464 | 175.25% |
| 21 | 0.832 | 0.877 | 0.045 | 105.37% | 0.397 | 220.98% |
| 22 | 0.899 | 1.015 | 0.116 | 112.95% | 0.397 | 255.83% |
| 31 | 0.888 | 0.987 | 0.098 | 111.07% | 0.710 | 138.98% |
| 32 | 1.197 | 1.237 | 0.041 | 103.41% | 0.710 | 174.31% |
| 41 | 1.642 | 1.689 | 0.046 | 102.81% | 0.873 | 193.53% |
| 42 | 2.320 | 2.541 | 0.221 | 109.54% | 0.873 | 291.23% |

Table 1 is the detailed structure data to the first embodiment in FIG. 1A, wherein the unit of the curvature radius, the thickness, the distance, and the focal length is millimeters (mm). Surfaces 0-14 illustrate the surfaces from the object side to the image plane in the optical image capturing system. Table 2 is the aspheric coefficients of the first embodiment, wherein k is the conic coefficient in the aspheric surface formula, and A1-A20 are the first to the twentieth order aspheric surface coefficient. Besides, the tables in the following embodiments are referenced to the schematic view and the aberration graphs, respectively, and definitions of parameters in the tables are equal to those in the Table 1 and the Table 2, so the repetitious details will not be given here.

The Second Embodiment (Embodiment 2)

Figure 2A:
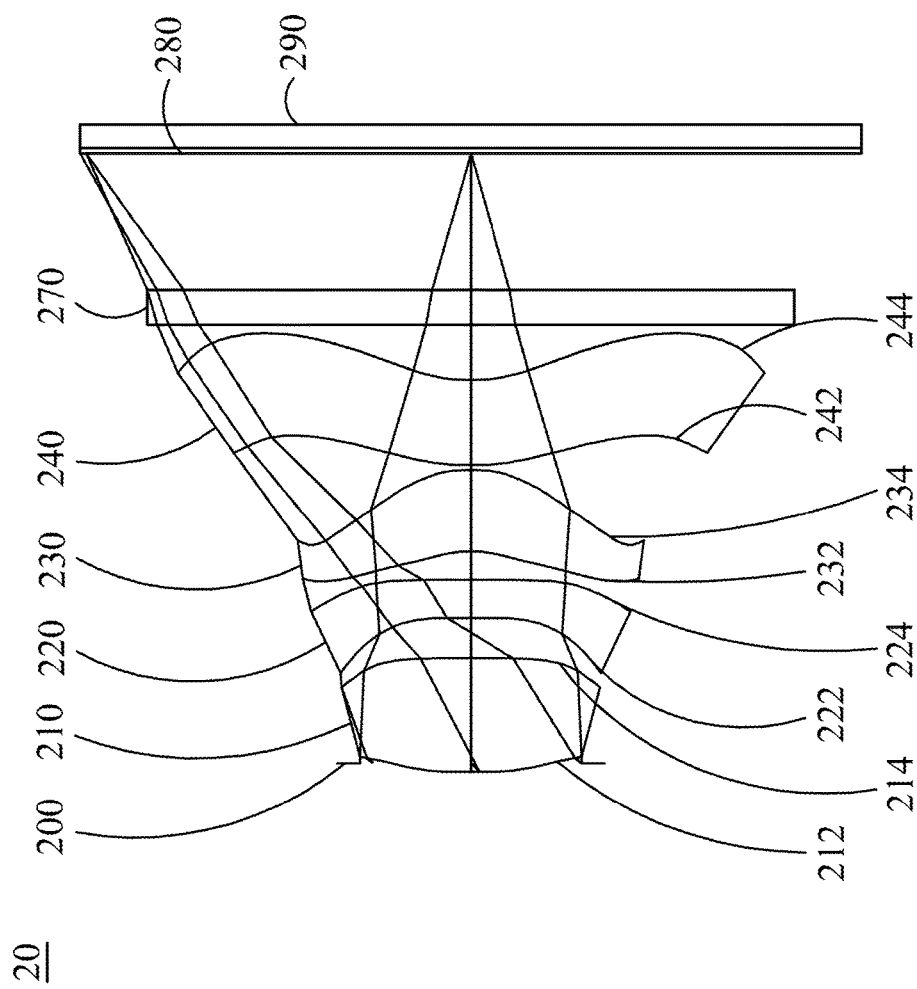
FIG. 2A is a schematic view of the optical image capturing system according to the second embodiment of the present application.
Figure 2B:
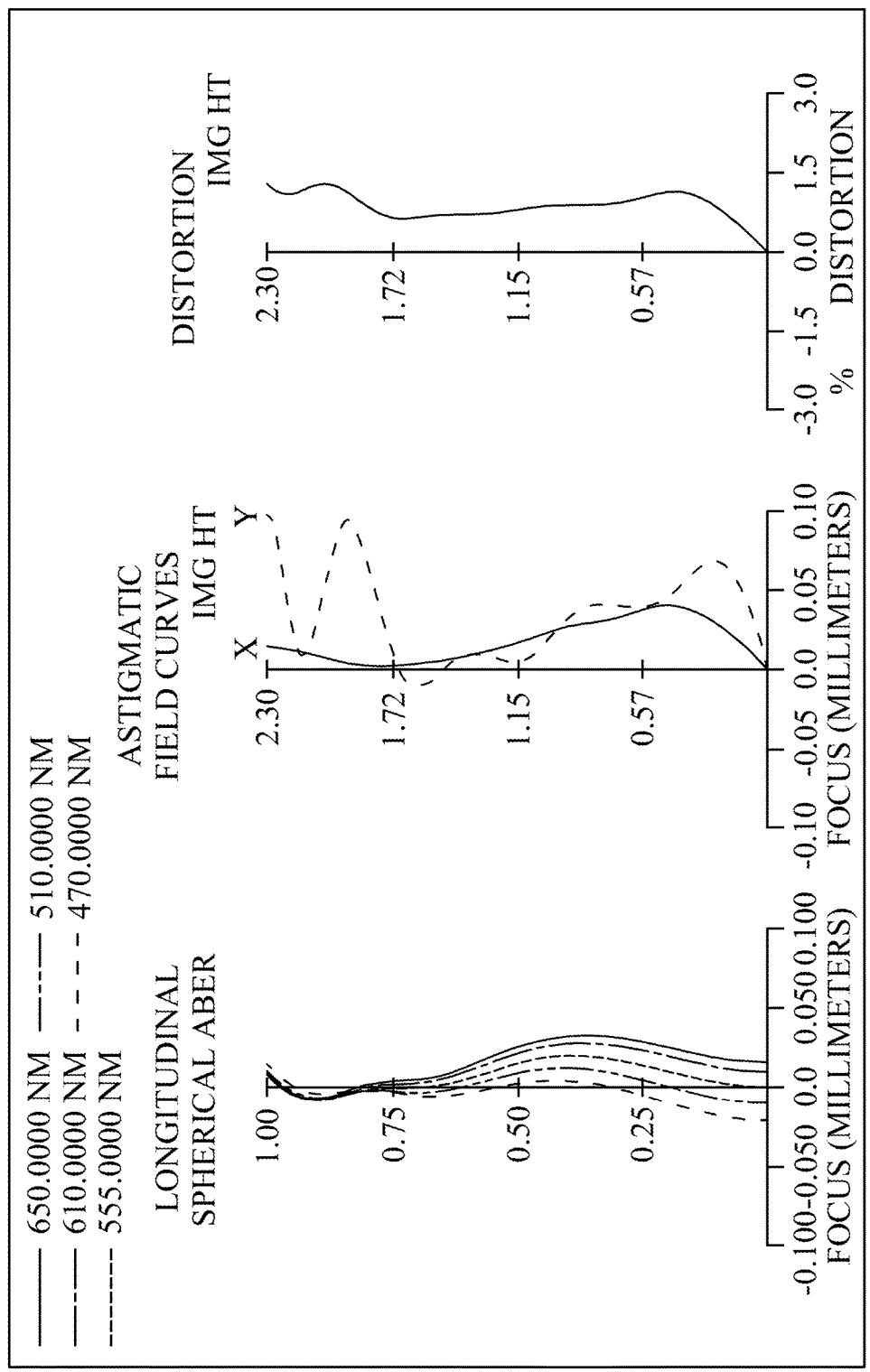
FIG. 2B is longitudinal spherical aberration curves, astigmatic field curves, and an optical distortion grid of the optical image capturing system in the order from left to right according to the second embodiment of the present application.
Figure 2C:
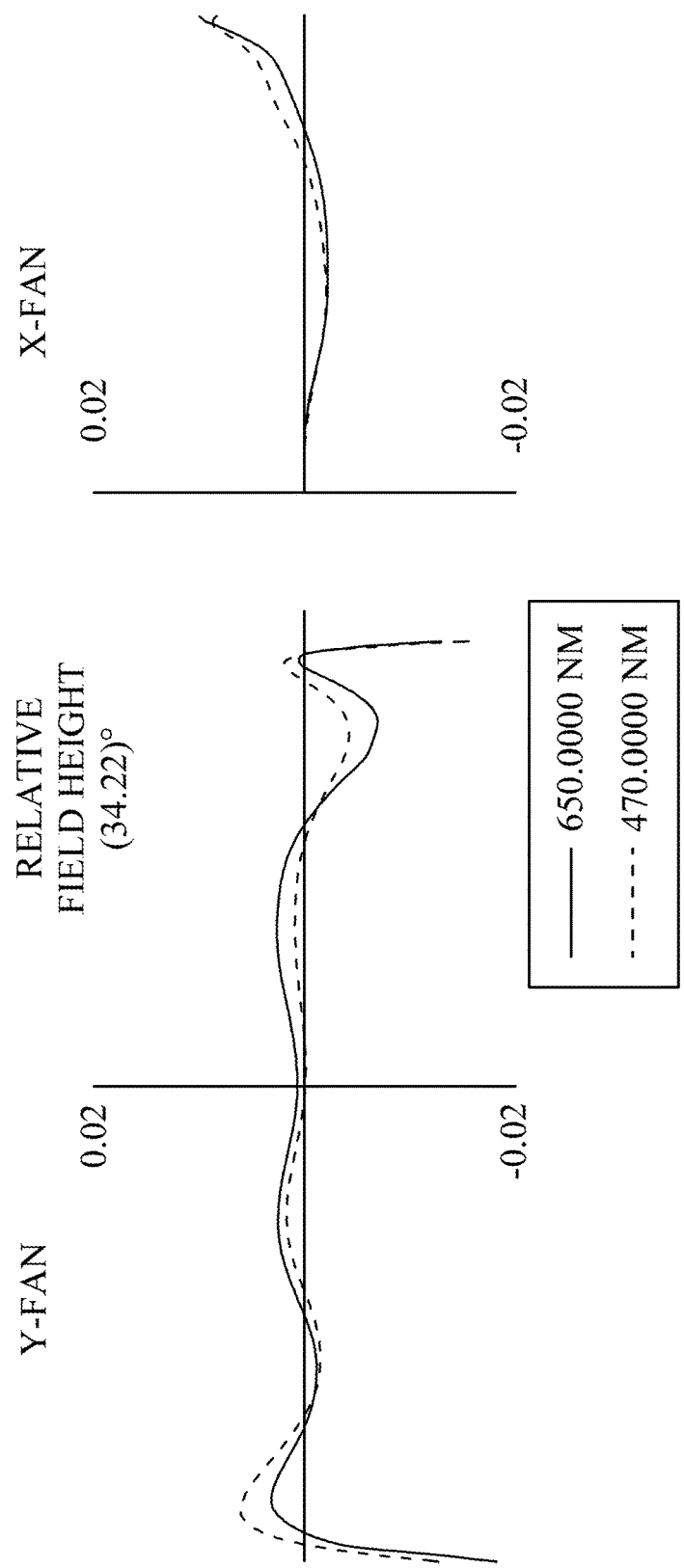
FIG. 2C is a lateral aberration diagram of tangential fan, sagittal fan, the longest operation wavelength and the shortest operation wavelength passing through an edge of the entrance pupil and incident on the image plane by 0.7 HOI according to the second embodiment of the present application.

Please refer to FIG. 2A, FIG. 2B and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a lateral aberration diagram of tangential fan, sagittal fan, the longest operation wavelength and the shortest operation wavelength passing through an edge of the entrance pupil and incident on the image plane by 0.7 HOI according to the second embodiment of the present application. As shown in FIG. 2A, in order from an object side to an image side, the optical image capturing system includes an aperture stop 200, first lens element 210, a second lens element 220, a third lens element 230, a fourth lens element 240, an IR-bandstop filter 270, an image plane 280, and an image sensing device 290.

The first lens element 210 has positive refractive power and it is made of plastic material. The first lens element 210 has a convex object-side surface 212 and a convex image-side surface 214, both of the object-side surface 212 and the image-side surface 214 are aspheric, and the object-side surface 212 has an inflection point.

The second lens element 220 has negative refractive power and it is made of plastic material. The second lens element 220 has a concave object-side surface 222 and a concave image-side surface 224, both of the object-side surface 222 and the image-side surface 224 are aspheric. The image-side surface 224 has an inflection point.

The third lens element 230 has positive refractive power and it is made of plastic material. The third lens element 230 has a concave object-side surface 232 and a convex image-side surface 234, and both of the object-side surface 232 and the image-side surface 234 are aspheric. The object-side surface 232 has four inflection points and the image-side surface 234 has an inflection point.

The fourth lens element 240 has negative refractive power and it is made of plastic material. The fourth lens element 240 has a convex object-side surface 242 and a concave image-side surface 244, both of the object-side surface 242 and the image-side surface 244 are aspheric, and the object-side surface 242 and the image-side surface 244 have an inflection point respectively.

The IR-bandstop filter 270 is made of glass material without affecting the focal length of the optical image capturing system and it is disposed between the fourth lens element 240 and the image plane 280.

In the optical image capturing system of the second embodiment, focal lengths of the second lens element 220 through the fourth lens element 240 are f2, f3 and f4 respectively. The following relations are satisfied: |f2|+|f3|=12.7333 mm, |f1|+|f4|=9.0015 mm and |f2|+|f3|>|f1|+|f4|.

In the optical image capturing system of the second embodiment, the first lens element 210 and the third lens element 230 are positive lens elements, and focal lengths of the first lens element 210 and the third lens element 230 are f1 and f3, respectively. A sum of focal lengths of all lens elements with positive refractive power is $\Sigma PP$. The following relations is satisfied: $\Sigma PP$=f1+f3. Hereby, it is favorable for allocating the positive refractive power of the first lens element 210 to other positive lens elements and the significant aberrations generated in the process of moving the incident light can be suppressed.

In the optical image capturing system of the second embodiment, focal lengths of the second lens element 220 and the fourth lens element 240 are f2 and f4, respectively. A sum of focal lengths of all lens elements with negative refractive power is $\Sigma NP$. The following relation is satisfied: $\Sigma NP$=f2+f4. Hereby, it is favorable for allocating the negative refractive power of the fourth lens element 240 to other negative lens elements.

Please refer to the following Table 3 and Table 4.

The detailed data of the optical image capturing system of the second embodiment is as shown in Table 3.

TABLE 3

Data of the optical image capturing system
f = 2.3521 mm, f/HEP = 1.8, HAF = 43.9997 deg, tan(HAF) = 0.96568

| Surface # | | Curvature Radius | Thickness | Material | Index | Abbe # | Focal length |
|---|---|---|---|---|---|---|---|
| 0 | Object | Plano | At infinity | | | | |
| 1 | Ape. stop | Plano | −0.050 | | | | |
| 2 | Lens 1 | 1.938213716 | 0.671 | Plastic | 1.544 | 56.09 | 3.163 |
| 3 | | −13.86250007 | −0.002 | | | | |
| 4 | Shading sheet | Plano | 0.238 | | | | |
| 5 | Lens 2 | −10.24620787 | 0.223 | Plastic | 1.642 | 22.46 | −10.176 |
| 6 | | 18.62755924 | 0.160 | | | | |
| 7 | Lens 3 | −0.850575158 | 0.483 | Plastic | 1.544 | 56.09 | 2.557 |
| 8 | | −0.634626709 | 0.026 | | | | |
| 9 | Lens 4 | 1.326898506 | 0.503 | Plastic | 1.544 | 56.09 | −5.839 |
| 10 | | 0.811386372 | 0.323 | | | | |
| 11 | IR-bandstop filter | Plano | 0.200 | BK7_SCHOTT | 1.517 | 64.13 | |
| 12 | | Plano | 0.800 | | | | |
| 13 | Image plane | Plano | | | | | |

Reference wavelength (d-line) = 555 nm

As for the parameters of the aspheric surfaces of the second embodiment, reference is made to Table 4.

TABLE 4

Aspheric Coefficients

| | Surface # | | | | | |
|---|---|---|---|---|---|---|
| | 2 | 3 | 5 | 6 | 7 | 8 |
| k = | −2.177737E+01 | −1.023100E+00 | −7.599347E−01 | −8.904065E+01 | −3.319907E−01 | −3.433203E+00 |
| A4 = | 3.966765E−01 | −4.104819E−01 | −9.969493E−01 | −2.819491E−01 | 9.371477E−01 | −5.081457E−01 |
| A6 = | −1.795462E+00 | 3.881327E−01 | 1.384998E+00 | 5.198925E−01 | 5.954294E−01 | −2.855486E−01 |
| A8 = | 7.459632E+00 | −2.566679E+00 | −1.688135E+01 | −3.276790E+00 | −2.960255E+00 | 9.830284E+00 |
| A10 = | −2.276732E+01 | 6.682022E+00 | 6.177807E+01 | 6.622781E+00 | −3.996158E−01 | −4.553455E+01 |
| A12 = | 3.884892E+01 | −8.258319E+00 | −8.855541E+01 | −5.332789E+00 | 9.467090E+00 | 1.139317E+02 |
| A14 = | −2.873114E+01 | 3.376030E+00 | 4.494460E+01 | 1.447432E+00 | −1.050707E+01 | −1.697212E+02 |
| A16 = | 0.000000E+00 | 0.000000E+00 | 0.000000E+00 | 0.000000E+00 | 3.619412E+00 | 1.497546E+02 |
| A18 = | 0.000000E+00 | 0.000000E+00 | 0.000000E+00 | 0.000000E+00 | 0.000000E+00 | −7.178255E+01 |
| A20 = | 0.000000E+00 | 0.000000E+00 | 0.000000E+00 | 0.000000E+00 | 0.000000E+00 | 1.431978E+01 |

TABLE 4-continued

Aspheric Coefficients

| | Surface # | |
|---|---|---|
| | 9 | 10 |
| k = | −2.343340E−01 | −6.182010E+00 |
| A4 = | −2.848821E−01 | −5.124499E−02 |
| A6 = | 1.084163E−03 | 2.352778E−02 |
| A8 = | 1.326129E−01 | −1.229831E−01 |
| A10 = | −1.356432E−01 | 2.146638E−01 |
| A12 = | −7.005224E−02 | −2.037958E−01 |
| A14 = | 2.296250E−01 | 1.144310E−01 |
| A16 = | −1.796832E−01 | −3.771172E−02 |
| A18 = | 6.235645E−02 | 6.718570E−03 |
| A20 = | −8.333592E−03 | −4.992218E−04 |

In the second embodiment, the presentation of the aspheric surface formula is similar to that in the first embodiment. Besides, the definitions of parameters in following tables are equal to those in the first embodiment, so the repetitious details will not be given here.

The following contents may be deduced from Table 3 and Table 4.

Second embodiment (Primary reference wavelength = 555 nm)

| InRS41 | InRS42 | HVT41 | HVT42 | |ODT|% | |TDT|% |
|---|---|---|---|---|---|
| 0.07355 | 0.03694 | 1.02659 | 1.20664 | 1.27193 | 0.65228 |
| |f/f1| | |f/f2| | |f/f3| | |f/f4| | |f1/f2| | |f2/f3| |
| 0.74375 | 0.23115 | 0.91971 | 0.40283 | 0.31079 | 3.97882 |
| ΣPPR | ΣNPR | ΣPPR/|ΣNPR| | ΣPP | ΣNP | f1/ΣPP |
| 1.66345 | 0.63398 | 2.62381 | 5.72004 | −16.01478 | 0.55289 |

| f4/ΣNP | IN12/f | IN23/f | IN34/f | TP3/f | TP4/f |
|---|---|---|---|---|---|
| 0.36460 | 0.10033 | 0.06813 | 0.01103 | 0.20553 | 0.21398 |
| InTL | HOS | HOS/HOI | InS/HOS | InTL/HOS | ΣTP/InTL |
| 2.30328 | 3.62606 | 1.57655 | 0.98621 | 0.63520 | 0.81672 |
| (TP1 + IN12)/TP2 | (TP4 + IN34)/TP3 | TP1/TP2 | TP3/TP4 | IN23/(TP2 + IN23 + TP3) | |
| 4.05841 | 1.09477 | 3.00237 | 0.96051 | 0.18479 | |
| |INRS41|/TP4 | |INRS42|/TP4 | HVT42/HOI | HVT42/HOS | | |
| 0.14613 | 0.07340 | 0.52463 | 0.33277 | | |
| PLTA | PSTA | NLTA | NSTA | SLTA | SSTA |
| −0.016 mm | −0.013 mm | −0.013 mm | −0.019 mm | 0.009 mm | 0.010 mm |

The following contents may be deduced from Table 3 and Table 4.

Related inflection point values of second embodiment (Primary reference wavelength: 555 nm)

| HIF111 | 0.55297 | HIF111/HOI | 0.24042 | SGI111 | 0.07443 | |SGI111|/(|SGI111| + TP1) | 0.09986 |
|---|---|---|---|---|---|---|---|
| HIF221 | 0.12972 | HIF221/HOI | 0.05640 | SGI221 | 0.00037 | |SGI221|/(|SGI221| + TP2) | 0.00167 |
| HIF311 | 0.35995 | HIF311/HOI | 0.15650 | SGI311 | −0.06237 | |SGI311|/(|SGI311| + TP3) | 0.11427 |
| HIF312 | 0.58401 | HIF312/HOI | 0.25392 | SGI312 | −0.11873 | |SGI312|/(|SGI312| + TP3) | 0.19717 |
| HIF313 | 0.69370 | HIF313/HOI | 0.30161 | SGI313 | −0.14464 | |SGI313|/(|SGI313| + TP3) | 0.23029 |
| HIF314 | 0.95222 | HIF314/HOI | 0.41401 | SGI314 | −0.17071 | |SGI314|/(|SGI314| + TP3) | 0.26097 |
| HIF321 | 0.68143 | HIF321/HOI | 0.29627 | SGI321 | −0.30171 | |SGI321|/(|SGI321| + TP3) | 0.38427 |
| HIF411 | 0.55156 | HIF411/HOI | 0.23981 | SGI411 | 0.09313 | |SGI411|/(|SGI411| + TP4) | 0.15615 |
| HIF421 | 0.54626 | HIF421/HOI | 0.23751 | SGI421 | 0.12543 | |SGI421|/(|SGI421| + TP4) | 0.19949 |

The numerical related to the length of outline curve is shown according to table 3 and table 4.

Second embodiment (Primary reference wavelength: 587.5 nm)

| ARE | ½(HEP) | ARE value | ARE − ½(HEP) | 2(ARE/HEP) % | TP | ARE/TP (%) |
|---|---|---|---|---|---|---|
| 11 | 0.653 | 0.662 | 0.008 | 101.28% | 0.671 | 98.63% |
| 12 | 0.653 | 0.666 | 0.013 | 101.97% | 0.671 | 99.30% |
| 21 | 0.653 | 0.708 | 0.055 | 108.40% | 0.223 | 316.94% |
| 22 | 0.653 | 0.657 | 0.004 | 100.57% | 0.223 | 294.05% |
| 31 | 0.653 | 0.668 | 0.015 | 102.31% | 0.483 | 138.27% |
| 32 | 0.653 | 0.723 | 0.070 | 110.68% | 0.483 | 149.59% |
| 41 | 0.653 | 0.666 | 0.013 | 101.93% | 0.503 | 132.32% |
| 42 | 0.653 | 0.675 | 0.022 | 103.38% | 0.503 | 134.20% |

| ARS | EHD | ARS value | ARS − EHD | (ARS/EHD) % | TP | ARS/TP(%) |
|---|---|---|---|---|---|---|
| 11 | 0.672 | 0.681 | 0.009 | 101.28% | 0.671 | 101.49% |
| 12 | 0.760 | 0.800 | 0.040 | 105.26% | 0.671 | 119.24% |

-continued

| Second embodiment (Primary reference wavelength: 587.5 nm) | | | | | |
|---|---|---|---|---|---|
| 21 | 0.765 | 0.881 | 0.117 | 115.25% | 0.223 | 394.29% |
| 22 | 0.942 | 0.987 | 0.046 | 104.86% | 0.223 | 441.86% |
| 31 | 0.988 | 1.007 | 0.019 | 101.96% | 0.483 | 208.31% |
| 32 | 1.024 | 1.144 | 0.120 | 111.71% | 0.483 | 236.55% |
| 41 | 1.396 | 1.434 | 0.038 | 102.70% | 0.503 | 284.81% |
| 42 | 1.724 | 1.834 | 0.110 | 106.38% | 0.503 | 364.48% |

The Third Embodiment (Embodiment 3)

Figure 3A:
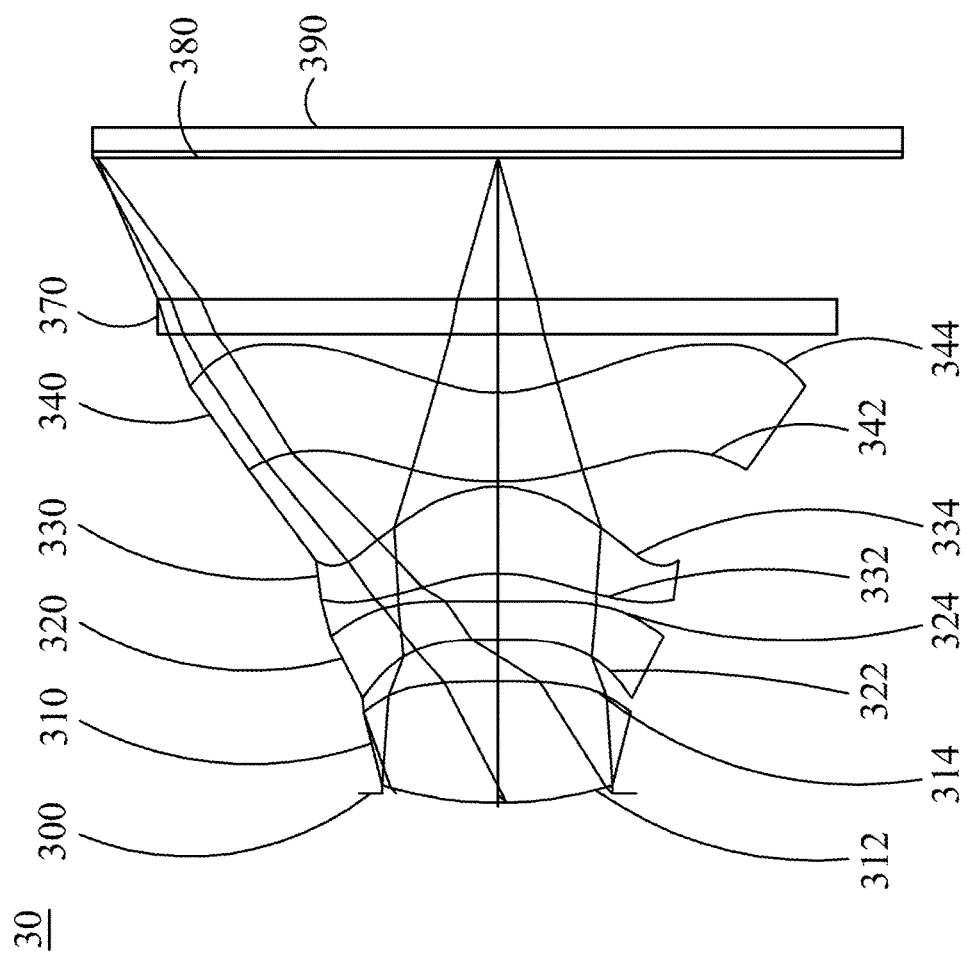
FIG. 3A is a schematic view of the optical image capturing system according to the third embodiment of the present application.
Figure 3B:
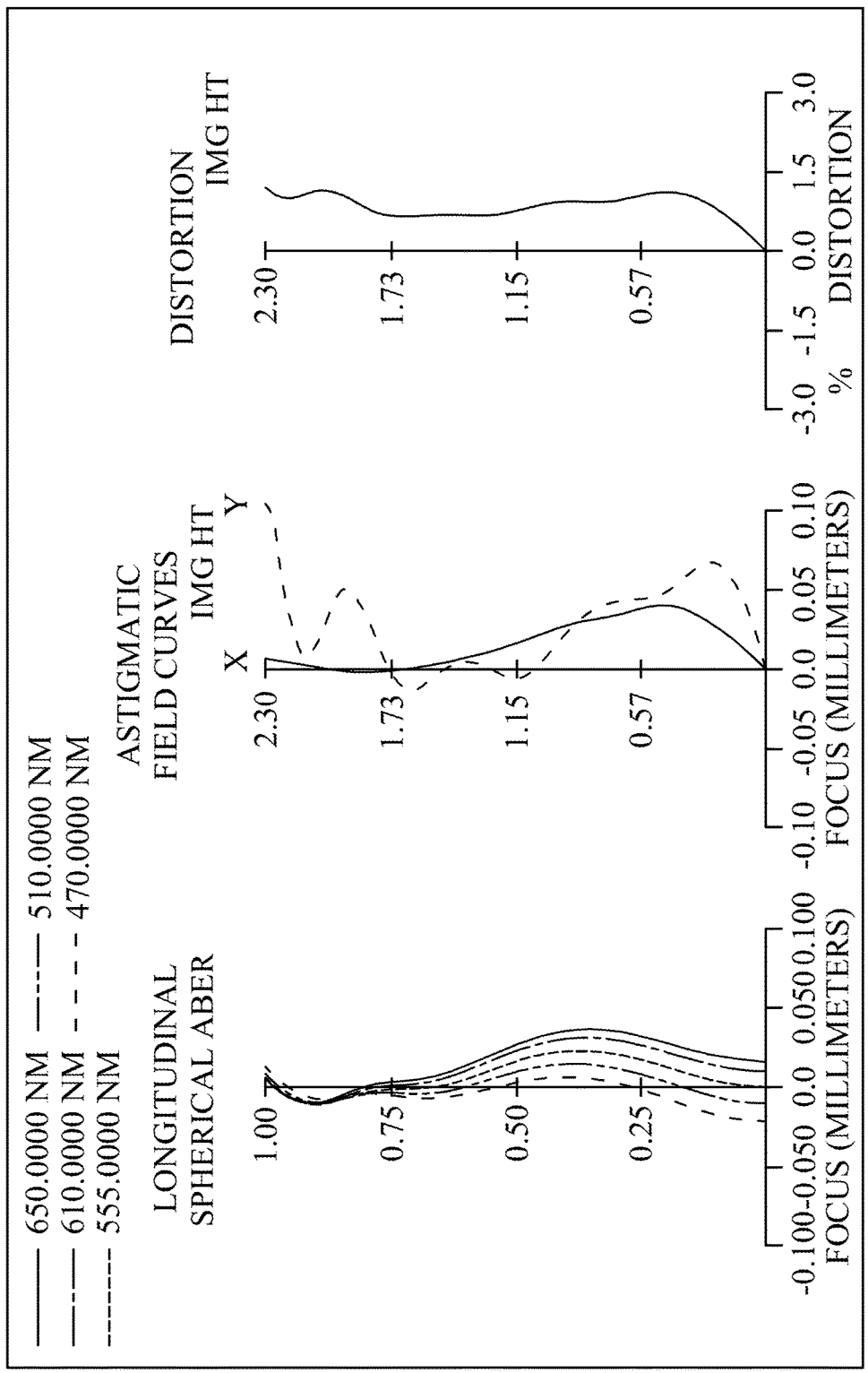
FIG. 3B is longitudinal spherical aberration curves, astigmatic field curves, and an optical distortion grid of the optical image capturing system in the order from left to right according to the third embodiment of the present application.
Figure 3C:
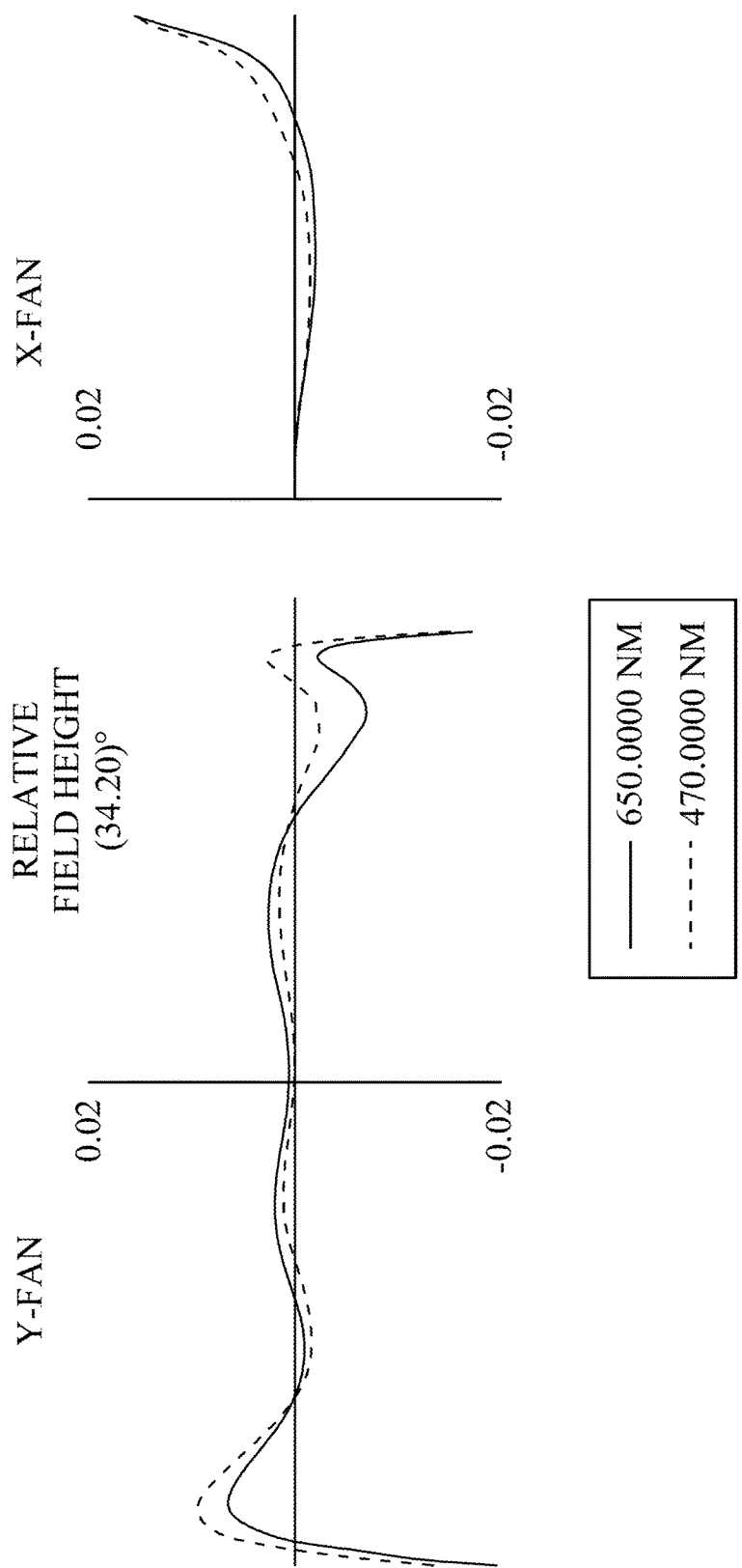
FIG. 3C is a lateral aberration diagram of tangential fan, sagittal fan, the longest operation wavelength and the shortest operation wavelength passing through an edge of the entrance pupil and incident on the image plane by 0.7 HOI according to the third embodiment of the present application.

Please refer to FIG. 3A, FIG. 3B and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a lateral aberration diagram of tangential fan, sagittal fan, the longest operation wavelength and the shortest operation wavelength passing through an edge of the entrance pupil and incident on the image plane by 0.7 HOI according to the third embodiment of the present application. As shown in FIG. 3A, in order from an object side to an image side, the optical image capturing system includes an aperture stop 300, first lens element 310, a second lens element 320, a third lens element 330, a fourth lens element 340, an IR-bandstop filter 370, an image plane 380, and an image sensing device 390.

The first lens element 310 has positive refractive power and it is made of plastic material. The first lens element 310 has a convex object-side surface 312 and a convex image-side surface 314, both of the object-side surface 312 and the image-side surface 314 are aspheric. The object-side surface 312 has an inflection point.

The second lens element 320 has negative refractive power and it is made of plastic material. The second lens element 320 has a concave object-side surface 322 and a concave image-side surface 324, both of the object-side surface 322 and the image-side surface 324 are aspheric. The image-side surface 324 has an inflection point.

The third lens element 330 has positive refractive power and it is made of plastic material. The third lens element 330 has a concave object-side surface 332 and a convex image-side surface 334, both of the object-side surface 332 and the image-side surface 334 are aspheric. The object-side surface 332 and the image-side surface 334 have two inflection points respectively.

The fourth lens element 340 has negative refractive power and it is made of plastic material. The fourth lens element 340 has a convex object-side surface 342 and a concave image-side surface 344, both of the object-side surface 342 and the image-side surface 344 are aspheric. The object-side surface 342 and the image-side surface 344 have an inflection point respectively.

The IR-bandstop filter 370 is made of glass material without affecting the focal length of the optical image capturing system and it is disposed between the fourth lens element 340 and the image plane 380.

In the optical image capturing system of the third embodiment, focal lengths of the second lens element 320 through the fourth lens element 340 are f2, f3 and f4 respectively. The following relations are satisfied: |f2|+|f3|=12.9833 mm, |f1|+|f4|=9.0429 mm and |f2|+|f3|>|f1|+|f4|.

In the optical image capturing system of the third embodiment, a sum of focal lengths of all lens elements with positive refractive power is ΣPP. The following relation is satisfied: ΣPP=f1+f3. Hereby, it is favorable for allocating the positive refractive power of the first lens element 310 to other positive lens elements and the significant aberrations generated in the process of moving the incident light can be suppressed.

In the optical image capturing system of the third embodiment, a sum of focal lengths of all lens elements with negative refractive power is ΣNP. The following relation is satisfied: ΣNP=f2+f4. Hereby, it is favorable for allocating the negative refractive power of the fourth lens element 340 to other negative lens elements.

Please refer to the following Table 5 and Table 6.

The detailed data of the optical image capturing system of the third embodiment is as shown in Table 5.

TABLE 5

Data of the optical image capturing system
f = 2.3542 mm, f/HEP = 1.8, HAF = 43.9999 deg, tan(HAF) = 0.96566

| Surface# | | Curvature Radius | Thickness | Material | Index | Abbe # | Focal length |
|---|---|---|---|---|---|---|---|
| 0 | Object | Plano | At infinity | | | | |
| 1 | Ape. stop | Plano | −0.050 | | | | |
| 2 | Lens 1 | 1.986765609 | 0.680 | Plastic | 1.544 | 56.09 | 3.220 |
| 3 | | −13.40015807 | 0.001 | | | | |
| 4 | Shading sheet | Plano | 0.241 | | | | |
| 5 | Lens 2 | −13.01452693 | 0.215 | Plastic | 1.642 | 22.46 | −10.447 |
| 6 | | 14.18207262 | 0.161 | | | | |
| 7 | Lens 3 | −0.8587634 | 0.489 | Plastic | 1.544 | 56.09 | 2.537 |
| 8 | | −0.636720641 | 0.025 | | | | |
| 9 | Lens 4 | 1.326929379 | 0.505 | Plastic | 1.544 | 56.09 | −5.823 |
| 10 | | 0.810330303 | 0.328 | | | | |
| 11 | IR-bandstop filter | Plano | 0.200 | BK7_SCHOTT | 1.517 | 64.13 | |

TABLE 5-continued

Data of the optical image capturing system
f = 2.3542 mm, f/HEP = 1.8, HAF = 43.9999 deg, tan(HAF) = 0.96566

| Surface# | Curvature Radius | Thickness | Material | Index | Abbe # | Focal length |
|---|---|---|---|---|---|---|
| 12 | | Plano | 0.800 | | | |
| 13 | Image plane | Plano | | | | |

Reference wavelength (d-line) = 555 nm; The clear aperture of the fourth surface is 0.772 mm.

As for the parameters of the aspheric surfaces of the third embodiment, reference is made to Table 6.

TABLE 6

Aspheric Coefficients

| Surface # | | | | | |
|---|---|---|---|---|---|
| 2 | 3 | 5 | 6 | 7 | 8 |
| k = −2.169835E+01 | −1.023100E+00 | −7.599347E−01 | −8.904065E+01 | −3.275003E−01 | −3.322399E+00 |
| A4 = 3.443483E−01 | −4.339406E−01 | −1.074319E+00 | −3.676701E−01 | 8.314431E−01 | −4.715007E−01 |
| A6 = −1.379554E+00 | 7.417974E−01 | 2.091521E+00 | 9.884165E−01 | 1.111260E+00 | −4.325835E−01 |
| A8 = 5.339244E+00 | −4.263400E+00 | −1.998596E+01 | −4.427655E+00 | −4.256519E+00 | 9.872267E+00 |
| A10 = −1.652800E+01 | 1.105245E+01 | 6.734218E+01 | 8.030609E+00 | 1.956255E+00 | −4.496641E+01 |
| A12 = 2.928238E+01 | −1.397816E+01 | −9.254723E+01 | −6.142826E+00 | 6.657354E+00 | 1.122459E+02 |
| A14 = −2.269702E+01 | 6.365437E+00 | 4.572555E+01 | 1.623563E+00 | −8.681680E+00 | −1.664824E+02 |
| A16 = 0.000000E+00 | 0.000000E+00 | 0.000000E+00 | 0.000000E+00 | 3.135416E+00 | 1.458519E+02 |
| A18 = 0.000000E+00 | 0.000000E+00 | 0.000000E+00 | 0.000000E+00 | 0.000000E+00 | −6.931591E+01 |
| A20 = 0.000000E+00 | 0.000000E+00 | 0.000000E+00 | 0.000000E+00 | 0.000000E+00 | 1.370263E+01 |

| Surface # | |
|---|---|
| 9 | 10 |
| k = −2.348430E−01 | −6.195413E+00 |
| A4 = −2.458901E−01 | −5.171263E−03 |
| A6 = −1.216824E−01 | −1.343401E−01 |
| A8 = 2.401647E−01 | 1.477699E−01 |
| A10 = −3.358441E−02 | −6.426788E−02 |
| A12 = −3.586247E−01 | −1.849741E−02 |
| A14 = 4.858174E−01 | 3.434063E−02 |
| A16 = −2.949679E−01 | −1.600035E−02 |
| A18 = 8.884417E−02 | 3.377881E−03 |
| A20 = −1.080120E−02 | −2.772887E−04 |

The presentation of the aspheric surface formula in the third embodiment is similar to that in the first embodiment. Besides, the definitions of parameters in following tables are equal to those in the first embodiment so the repetitious details will not be given here.

The following contents may be deduced from Table 5 and Table 6

Third embodiment (Primary reference wavelength: 555 nm)

| InRS41 | InRS42 | HVT41 | HVT42 | |ODT| % | |TDT| % |
|---|---|---|---|---|---|
| 0.07135 | 0.03343 | 1.03331 | 1.22145 | 1.17137 | 0.55154 |
| |f/f1| | |f/f2| | |f/f3| | |f/f4| | |f1/f2| | |f2/f3| |
| 0.73113 | 0.22535 | 0.92807 | 0.40428 | 0.30822 | 4.11837 |
| ΣPPR | ΣNPR | ΣPPR/|ΣNPR| | ΣPP | ΣNP | f1/ΣPP |
| 1.65920 | 0.62963 | 2.63519 | 5.75650 | −16.26973 | 0.55935 |

Third embodiment (Primary reference wavelength: 555 nm)

| f4/ΣNP | IN12/f | IN23/f | IN34/f | TP3/f | TP4/f |
|---|---|---|---|---|---|
| 0.35791 | 0.10281 | 0.06856 | 0.01062 | 0.20793 | 0.21451 |
| InTL | HOS | HOS/HOI | InS/HOS | InTL/HOS | ΣTP/InTL |
| 2.31755 | 3.64581 | 1.58513 | 0.98629 | 0.63567 | 0.81514 |
| (TP1 + IN12)/TP2 | (TP4 + IN34)/TP3 | TP1/TP2 | TP3/TP4 | IN23/(TP2 + IN23 + TP3) | |
| 4.28663 | 1.08274 | 3.16098 | 0.96930 | 0.18640 | |
| |INRS41|/TP4 | |INRS42|/TP4 | HVT42/HOI | HVT42/HOS | | |
| 0.14129 | 0.06620 | 0.53107 | 0.33503 | | |
| PLTA | PSTA | NLTA | NSTA | SLTA | SSTA |
| −0.015 mm | −0.017 mm | −0.014 mm | −0.019 mm | 0.015 mm | 0.015 mm |

The following contents may be deduced from Table 5 and Table 6.

Related inflection point values of third embodiment (Primary reference wavelength: 555 nm)

| HIF111 | 0.55540 | HIF111/HOI | 0.24148 | SGI111 | 0.07296 | |SGI111|/(|SGI111| + TP1) | 0.09694 |
|---|---|---|---|---|---|---|---|
| HIF221 | 0.13265 | HIF221/HOI | 0.05767 | SGI221 | 0.00051 | |SGI221|/(|SGI221| + TP2) | 0.00237 |
| HIF311 | 0.35942 | HIF311/HOI | 0.15627 | SGI311 | −0.06239 | |SGI311|/(|SGI311| + TP3) | 0.11305 |

-continued

| Related inflection point values of third embodiment (Primary reference wavelength: 555 nm) | | | | | | |
|---|---|---|---|---|---|---|
| HIF312 | 0.96665 | HIF312/HOI | 0.42028 | SGI312 | −0.15089 | \|SGI312\|/(\|SGI312\| + TP3) | 0.23562 |
| HIF321 | 0.68195 | HIF321/HOI | 0.29650 | SGI321 | −0.30515 | \|SGI321\|/(\|SGI321\| + TP3) | 0.38400 |
| HIF322 | 1.02845 | HIF322/HOI | 0.44715 | SGI322 | −0.41969 | \|SGI322\|/(\|SGI322\| + TP3) | 0.46161 |
| HIF411 | 0.54324 | HIF411/HOI | 0.23619 | SGI411 | 0.09206 | \|SGI411\|/(\|SGI411\| + TP4) | 0.15419 |
| HIF421 | 0.54336 | HIF421/HOI | 0.23624 | SGI421 | 0.12597 | \|SGI421\|/(\|SGI421\| + TP4) | 0.19964 |

The numerical related to the length of outline curve is shown according to table 5 and table 6.

| Third embodiment (Primary reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.654 | 0.661 | 0.007 | 101.13% | 0.680 | 97.31% |
| 12 | 0.654 | 0.666 | 0.012 | 101.80% | 0.680 | 97.96% |
| 21 | 0.654 | 0.710 | 0.056 | 108.50% | 0.215 | 330.01% |
| 22 | 0.654 | 0.657 | 0.003 | 100.45% | 0.215 | 305.53% |
| 31 | 0.654 | 0.668 | 0.014 | 102.17% | 0.489 | 136.49% |
| 32 | 0.654 | 0.725 | 0.071 | 110.81% | 0.489 | 148.03% |
| 41 | 0.654 | 0.666 | 0.012 | 101.89% | 0.505 | 131.94% |
| 42 | 0.654 | 0.676 | 0.022 | 103.38% | 0.505 | 133.87% |
| ARS | EHD | ARS value | ARS − EHD | (ARS/EHD) % | TP | ARS/TP (%) |
| 11 | 0.672 | 0.680 | 0.008 | 101.13% | 0.680 | 99.98% |
| 12 | 0.760 | 0.798 | 0.038 | 105.03% | 0.680 | 117.46% |
| 21 | 0.766 | 0.886 | 0.120 | 115.69% | 0.215 | 411.90% |
| 22 | 0.946 | 0.991 | 0.045 | 104.71% | 0.215 | 460.75% |
| 31 | 1.004 | 1.023 | 0.019 | 101.90% | 0.489 | 208.96% |
| 32 | 1.038 | 1.163 | 0.125 | 112.08% | 0.489 | 237.68% |
| 41 | 1.407 | 1.448 | 0.040 | 102.85% | 0.505 | 286.67% |
| 42 | 1.745 | 1.861 | 0.116 | 106.63% | 0.505 | 368.43% |

The Fourth Embodiment (Embodiment 4)

Figure 4A:
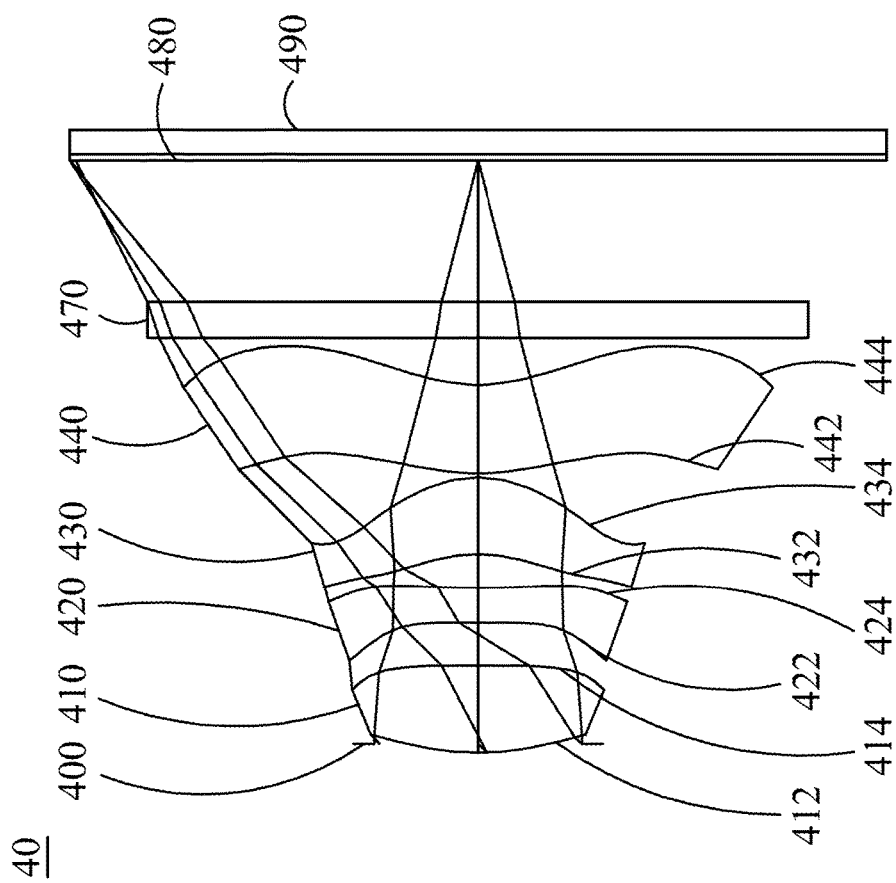
FIG. 4A is a schematic view of the optical image capturing system according to the fourth embodiment of the present application.
Figure 4B:
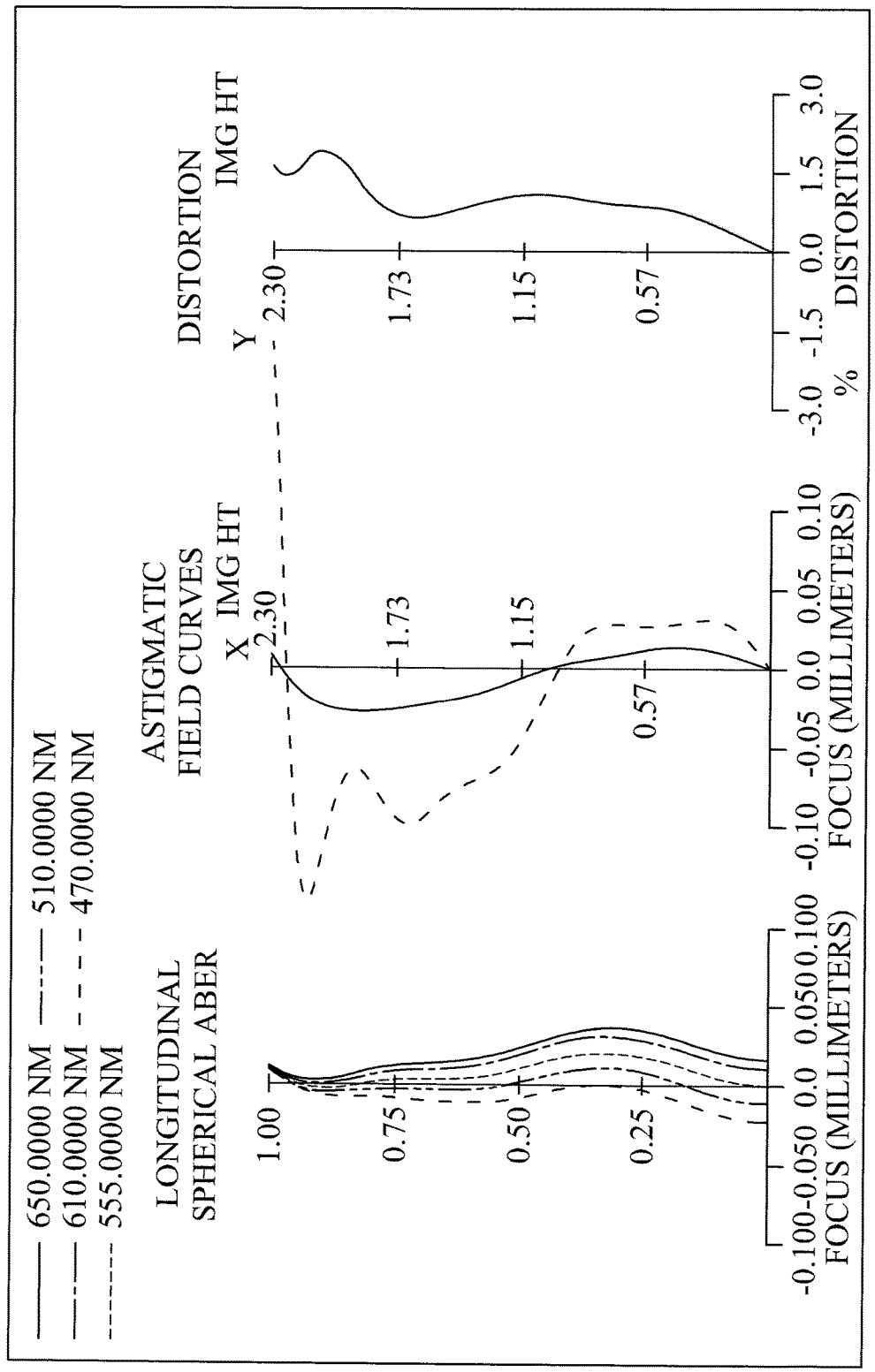
FIG. 4B is longitudinal spherical aberration curves, astigmatic field curves, and an optical distortion grid of the optical image capturing system in the order from left to right according to the fourth embodiment of the present application.
Figure 4C:
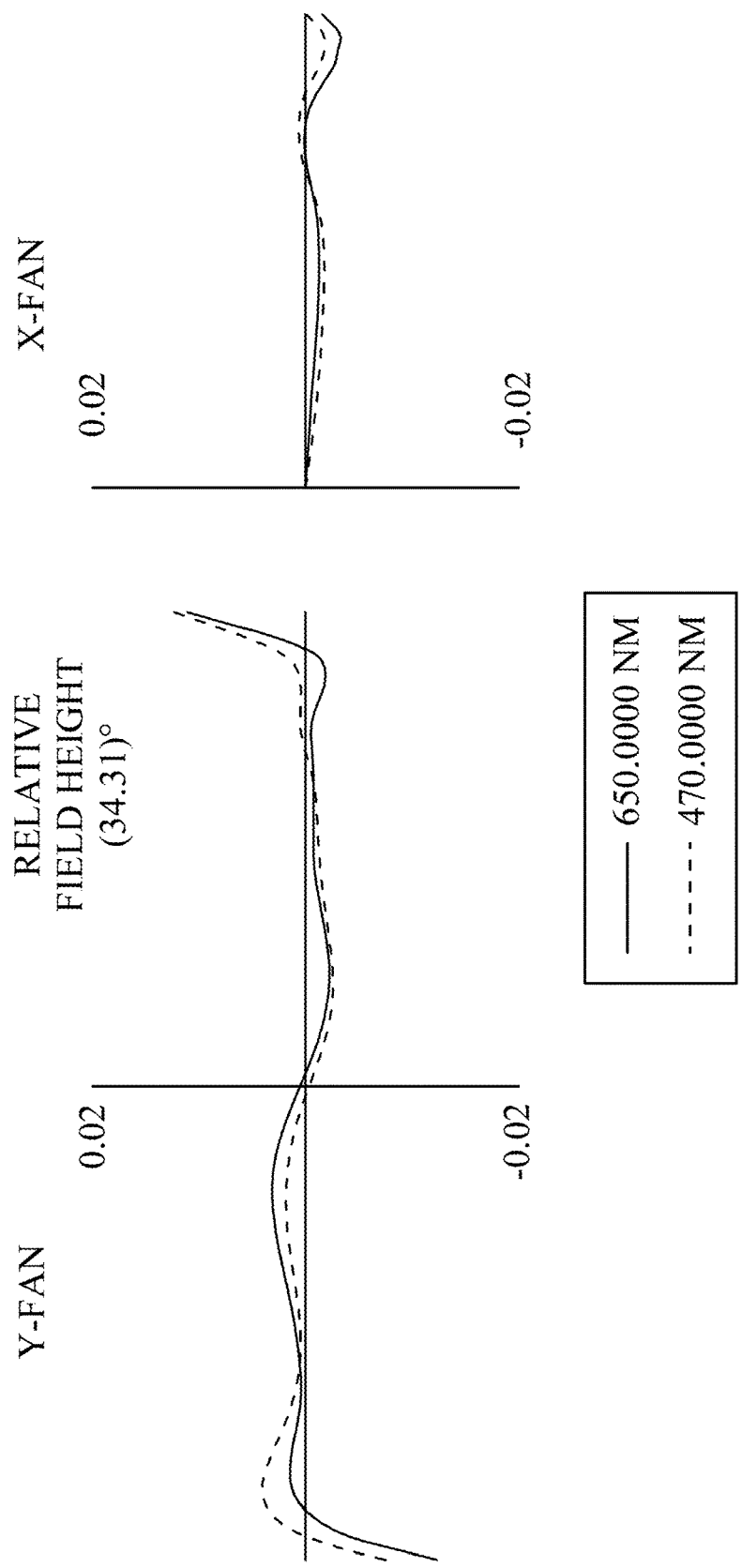
FIG. 4C is a lateral aberration diagram of tangential fan, sagittal fan, the longest operation wavelength and the shortest operation wavelength passing through an edge of the entrance pupil and incident on the image plane by 0.7 HOI according to the fourth embodiment of the present application.

Please refer to FIG. 4A, FIG. 4B and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a lateral aberration diagram of tangential fan, sagittal fan, the longest operation wavelength and the shortest operation wavelength passing through an edge of the entrance pupil and incident on the image plane by 0.7 HOI according to the fourth embodiment of the present application. As shown in FIG. 4A, in order from an object side to an image side, the optical image capturing system includes an aperture stop 400, first lens element 410, a second lens element 420, a third lens element 430, a fourth lens element 440, an IR-bandstop filter 470, an image plane 480, and an image sensing device 490.

The first lens element 410 has positive refractive power and it is made of plastic material. The first lens element 410 has a convex object-side surface 412 and a concave image-side surface 414, both of the object-side surface 412 and the image-side surface 414 are aspheric, and the object-side surface 412 and the image-side surface 414 have an inflection point respectively.

The second lens element 420 has negative refractive power and it is made of plastic material. The second lens element 420 has a convex object-side surface 422 and a concave image-side surface 424, both of the object-side surface 422 and the image-side surface 424 are aspheric, and the object-side surface 422 has two inflection points and the image-side surface 424 has an inflection point.

The third lens element 430 has positive refractive power and it is made of plastic material. The third lens element 430 has a concave object-side surface 432 and a convex image-side surface 434, both of the object-side surface 432 and the image-side surface 434 are aspheric, and the object-side surface 432 has two inflection points and the image-side surface 434 has an inflection point.

The fourth lens element 440 has negative refractive power and it is made of plastic material. The fourth lens element 440 has a convex object-side surface 442 and a concave image-side surface 444, both of the object-side surface 442 and the image-side surface 444 are aspheric, and the object-side surface 442 and the image-side surface 444 have an inflection point respectively.

The IR-bandstop filter 470 is made of glass material without affecting the focal length of the optical image capturing system and it is disposed between the fourth lens element 440 and the image plane 480.

In the optical image capturing system of the fourth embodiment, focal lengths of the second lens element 420 through the fourth lens element 440 are f2, f3 and f4 respectively. The following relations are satisfied: |f2|+|f3|=16.7265 mm, |f1|+|f4|=9.9617 mm and |f2|+|f3|>|f1|+|f4|.

In the optical image capturing system of the fourth embodiment, a sum of focal lengths of all lens elements with positive refractive power is ΣPP. The following relation is satisfied: ΣPP=f1+f3. Hereby, it is favorable for allocating the positive refractive power of the first lens element 410 to other positive lens elements and the significant aberrations generated in the process of moving the incident light can be suppressed.

In the optical image capturing system of the fourth embodiment, a sum of focal lengths of all lens elements with negative refractive power is ΣNP. The following relation is satisfied: ΣNP=f2+f4. Hereby, it is favorable for allocating the negative refractive power of the fourth lens element 440 to other negative lens elements.

Please refer to the following Table 7 and Table 8.

The detailed data of the optical image capturing system of the fourth embodiment is as shown in Table 7.

The presentation of the aspheric surface formula in the fourth embodiment is similar to that in the first embodiment. Besides the definitions of parameters in following tables are equal to those in the first embodiment so the repetitious details will not be given here.

The following contents may be deduced from Table 7 and Table 8.

TABLE 7

Data of the optical image capturing system
f = 2.3442 mm, f/HEP = 2.070, HAF = 44.0000 deg, tan(HAF) = 0.96569

| Surface # | | Curvature Radius | Thickness | Material | Index | Abbe # | Focal length |
|---|---|---|---|---|---|---|---|
| 0 | Object | Plano | At infinity | | | | |
| 1 | Ape. stop | Plano | −0.050 | | | | |
| 2 | Lens 1 | 1.54478222 | 0.487 | Plastic | 1.544 | 56.09 | 3.082 |
| 3 | | 16.7930775 | 0.001 | | | | |
| 4 | Shading sheet | Plano | 0.240 | | | | |
| 5 | Lens 2 | 12.0808192 | 0.200 | Plastic | 1.642 | 22.46 | −13.701 |
| 6 | | 5.082491689 | 0.186 | | | | |
| 7 | Lens 3 | −0.89540048 | 0.432 | Plastic | 1.544 | 52.90 | 3.025 |
| 8 | | −0.679833885 | 0.025 | | | | |
| 9 | Lens 4 | 1.365501136 | 0.497 | Plastic | 1.544 | 56.09 | −6.880 |
| 10 | | 0.872742597 | 0.266 | | | | |
| 11 | IR-band stop filter | Plano | 0.200 | BK7_SCHOTT | 1.517 | 64.13 | |
| 12 | | Plano | 0.800 | | | | |
| 13 | Image plane | Plano | | | | | |

Reference wavelength (d-line) = 555 nm; The clear aperture of the fourth surface is 0.723 mm.

As for the parameters of the aspheric surfaces of the fourth embodiment, reference is made to Table 8.

TABLE 8

Aspheric Coefficients

| Surface # | 2 | 3 | 5 | 6 | 7 | 8 |
|---|---|---|---|---|---|---|
| k = | −1.731429E+01 | −2.676670E−06 | −3.678229E−02 | −8.998956E+01 | −1.130900E−01 | −3.865357E+00 |
| A4 = | 4.737695E−01 | −4.074658E−01 | −1.019036E+00 | −3.726537E−01 | 8.180921E−01 | −8.631224E−01 |
| A6 = | −1.039006E+00 | 5.144696E−01 | 4.333086E+00 | 2.020889E+00 | −2.330334E+00 | 1.636988E+00 |
| A8 = | −1.297225E+00 | −4.728974E+00 | −3.499760E+01 | −9.038652E+00 | 2.182057E+01 | 5.831143E−01 |
| A10 = | 1.306553E+01 | 1.163796E+01 | 1.057741E+02 | 1.733202E+01 | −8.031341E+01 | −1.396189E+01 |
| A12 = | −3.028718E+01 | −1.319640E+01 | −1.367989E+02 | −1.528333E+01 | 1.426075E+02 | 4.769059E+01 |
| A14 = | 1.800632E+01 | 3.838551E+00 | 6.617539E+01 | 5.116787E+00 | −1.245757E+02 | −8.343037E+01 |
| A16 = | 0.000000E+00 | 0.000000E+00 | 0.000000E+00 | 0.000000E+00 | 4.329677E+01 | 8.312053E+01 |
| A18 = | 0.000000E+00 | 0.000000E+00 | 0.000000E+00 | 0.000000E+00 | 0.000000E+00 | −4.494637E+01 |
| A20 = | 0.000000E+00 | 0.000000E+00 | 0.000000E+00 | 0.000000E+00 | 0.000000E+00 | 1.023251E+01 |

| Surface # | 7 | 8 |
|---|---|---|
| k = | −1.274781E−01 | −4.365098E+00 |
| A4 = | −5.256318E−01 | −3.166917E−01 |
| A6 = | 5.968521E−01 | 6.016502E−01 |
| A8 = | −1.021886E+00 | −1.060367E+00 |
| A10 = | 1.431483E+00 | 1.278886E+00 |
| A12 = | −1.581217E+00 | −1.021661E+00 |
| A14 = | 1.282935E+00 | 5.266889E−01 |
| A16 = | −6.792613E−01 | −1.670045E−01 |
| A18 = | 2.030504E−01 | 2.944449E−02 |
| A20 = | −2.576893E−02 | −2.201968E−03 |

| Fourth embodiment (Primary reference wavelength: 555 nm) | | | | | |
|---|---|---|---|---|---|
| InRS41 | InRS42 | HVT41 | HVT42 | \|ODT\|% | \|TDT\|% |
| 0.02514 | −0.01296 | 0.86343 | 1.07635 | 1.88867 | 1.26818 |
| \|f/f1\| | \|f/f2\| | \|f/f3\| | \|f/f4\| | \|f1/f2\| | \|f2/f3\| |
| 0.76065 | 0.17110 | 0.77485 | 0.34074 | 0.22493 | 4.52874 |
| ΣPPR | ΣNPR | ΣPPR/\|ΣNPR\| | ΣPP | ΣNP | f1/ΣPP |
| 1.53550 | 0.51183 | 3.00001 | 6.10722 | −20.58094 | 0.50462 |
| f4/ΣNP | IN12/f | IN23/f | IN34/f | TP3/f | TP4/f |
| 0.33428 | 0.10288 | 0.07955 | 0.01071 | 0.18449 | 0.21193 |
| InTL | HOS | HOS/HOI | InS/HOS | InTL/HOS | ΣTP/InTL |
| 2.06950 | 3.33500 | 1.45000 | 0.98501 | 0.62054 | 0.78121 |
| (TP1 + IN12)/TP2 | (TP4 + IN34)/TP3 | TP1/TP2 | TP3/TP4 | IN23/(TP2 + IN23 + TP3) | |
| 3.64301 | 1.20675 | 2.43709 | 0.87055 | 0.22771 | |
| \|INRS41\|/TP4 | \|INRS42\|/TP4 | HVT42/HOI | HVT42/HOS | | |
| 0.05060 | 0.02609 | 0.46798 | 0.32274 | | |
| PLTA | PSTA | NLTA | NSTA | SLTA | SSTA |
| 0.013 mm | 0.012 mm | −0.008 mm | −0.013 mm | −0.00014 mm | −0.002 mm |

The following contents may be deduced from Table 7 and Table 8.

| Related inflection point values of fourth embodiment (Primary reference wavelength: 555 nm) | | | | | | | |
|---|---|---|---|---|---|---|---|
| HIF111 | 0.49704 | HIF111/HOI | 0.21610 | SGI111 | 0.07515 | \|SGI111\|/(\|SGI111\| + TP1) | 0.13358 |
| HIF121 | 0.11212 | HIF121/HOI | 0.04875 | SGI121 | 0.00031 | \|SGI121\|/(\|SGI121\| + TP1) | 0.00064 |
| HIF211 | 0.08529 | HIF211/HOI | 0.03708 | SGI211 | 0.00025 | \|SGI211\|/(\|SGI211\| + TP2) | 0.00124 |
| HIF212 | 0.69466 | HIF212/HOI | 0.30202 | SGI212 | −0.18451 | \|SGI212\|/(\|SGI212\| + TP2) | 0.47985 |
| HIF221 | 0.25246 | HIF221/HOI | 0.10977 | SGI221 | 0.00484 | \|SGI221\|/(\|SGI221\| + TP2) | 0.02361 |
| HIF311 | 0.37483 | HIF311/HOI | 0.16297 | SGI311 | −0.06701 | \|SGI311\|/(\|SGI311\| + TP3) | 0.13415 |
| HIF312 | 0.66788 | HIF312/HOI | 0.29038 | SGI312 | −0.13602 | \|SGI312\|/(\|SGI312\| + TP3) | 0.23925 |
| HIF321 | 0.60353 | HIF321/HOI | 0.26241 | SGI321 | −0.24416 | \|SGI321\|/(\|SGI321\| + TP3) | 0.36084 |
| HIF411 | 0.44629 | HIF411/HOI | 0.19404 | SGI411 | 0.05733 | \|SGI411\|/(\|SGI411\| + TP4) | 0.10346 |
| HIF421 | 0.48273 | HIF421/HOI | 0.20988 | SGI421 | 0.09815 | \|SGI421\|/(\|SGI421\| + TP4) | 0.16497 |

The numerical related to the length of outline curve is shown according to table 7 and table 8.

| Fourth embodiment (Primary reference wavelength: 555 nm) | | | | | | |
|---|---|---|---|---|---|---|
| ARE | ½(HEP) | ARE value | ARE − ½(HEP) | 2(ARE/HEP)% | TP | ARE/TP (%) |
| 11 | 0.586 | 0.596 | 0.010 | 101.69% | 0.487 | 122.27% |
| 12 | 0.586 | 0.591 | 0.005 | 100.91% | 0.487 | 121.33% |
| 21 | 0.586 | 0.606 | 0.020 | 103.47% | 0.200 | 303.18% |
| 22 | 0.586 | 0.586 | 0.000 | 100.07% | 0.200 | 293.23% |
| 31 | 0.586 | 0.600 | 0.014 | 102.41% | 0.432 | 138.77% |
| 32 | 0.586 | 0.641 | 0.055 | 109.36% | 0.432 | 148.20% |
| 41 | 0.586 | 0.593 | 0.007 | 101.19% | 0.497 | 119.37% |
| 42 | 0.586 | 0.602 | 0.016 | 102.78% | 0.497 | 121.24% |
| ARS | EHD | ARS value | ARS − EHD | (ARS/EHD)% | TP | ARS/TP (%) |
| 11 | 0.622 | 0.631 | 0.009 | 101.52% | 0.487 | 129.54% |
| 12 | 0.710 | 0.743 | 0.033 | 104.63% | 0.487 | 152.40% |
| 21 | 0.728 | 0.788 | 0.060 | 108.19% | 0.200 | 393.89% |
| 22 | 0.848 | 0.861 | 0.013 | 101.50% | 0.200 | 430.35% |
| 31 | 0.870 | 0.892 | 0.022 | 102.47% | 0.432 | 206.21% |
| 32 | 0.948 | 1.043 | 0.095 | 110.00% | 0.432 | 241.19% |
| 41 | 1.403 | 1.424 | 0.021 | 101.52% | 0.497 | 286.61% |
| 42 | 1.730 | 1.868 | 0.138 | 107.97% | 0.497 | 376.05% |

The Fifth Embodiment (Embodiment 5)

Figure 5A:
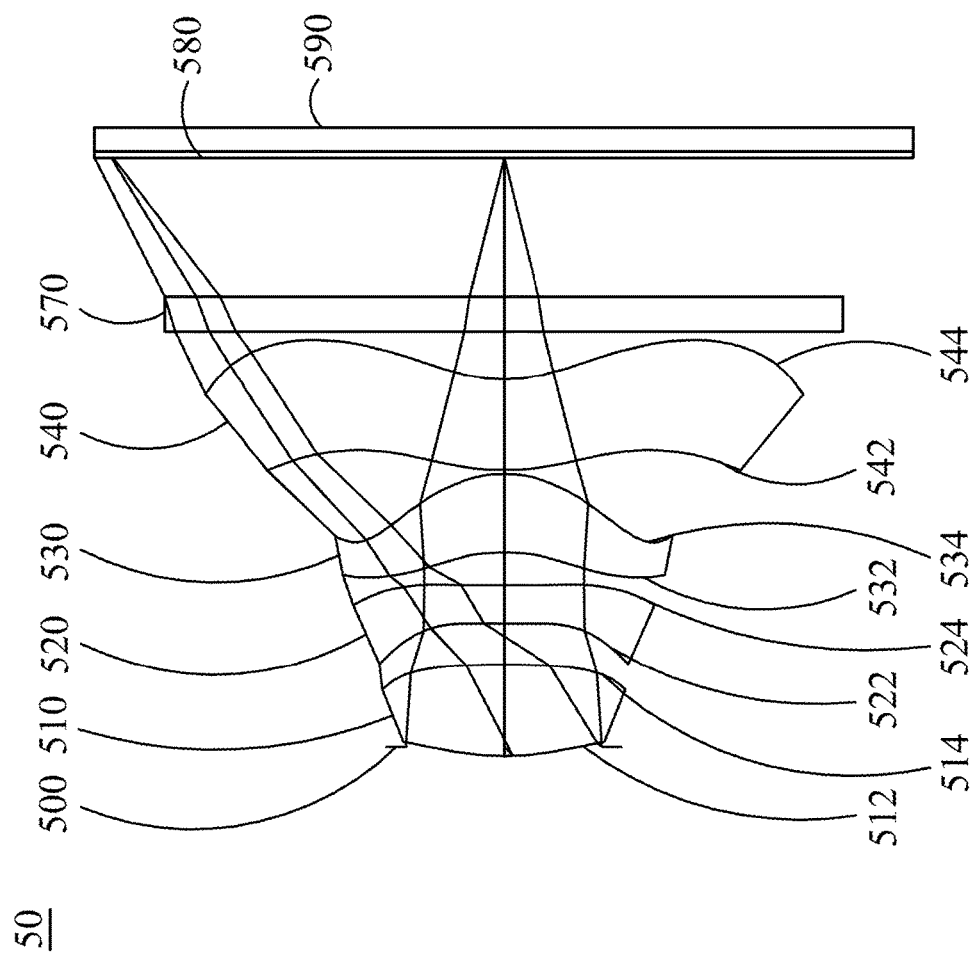
FIG. 5A is a schematic view of the optical image capturing system according to the fifth embodiment of the present application.
Figure 5B:
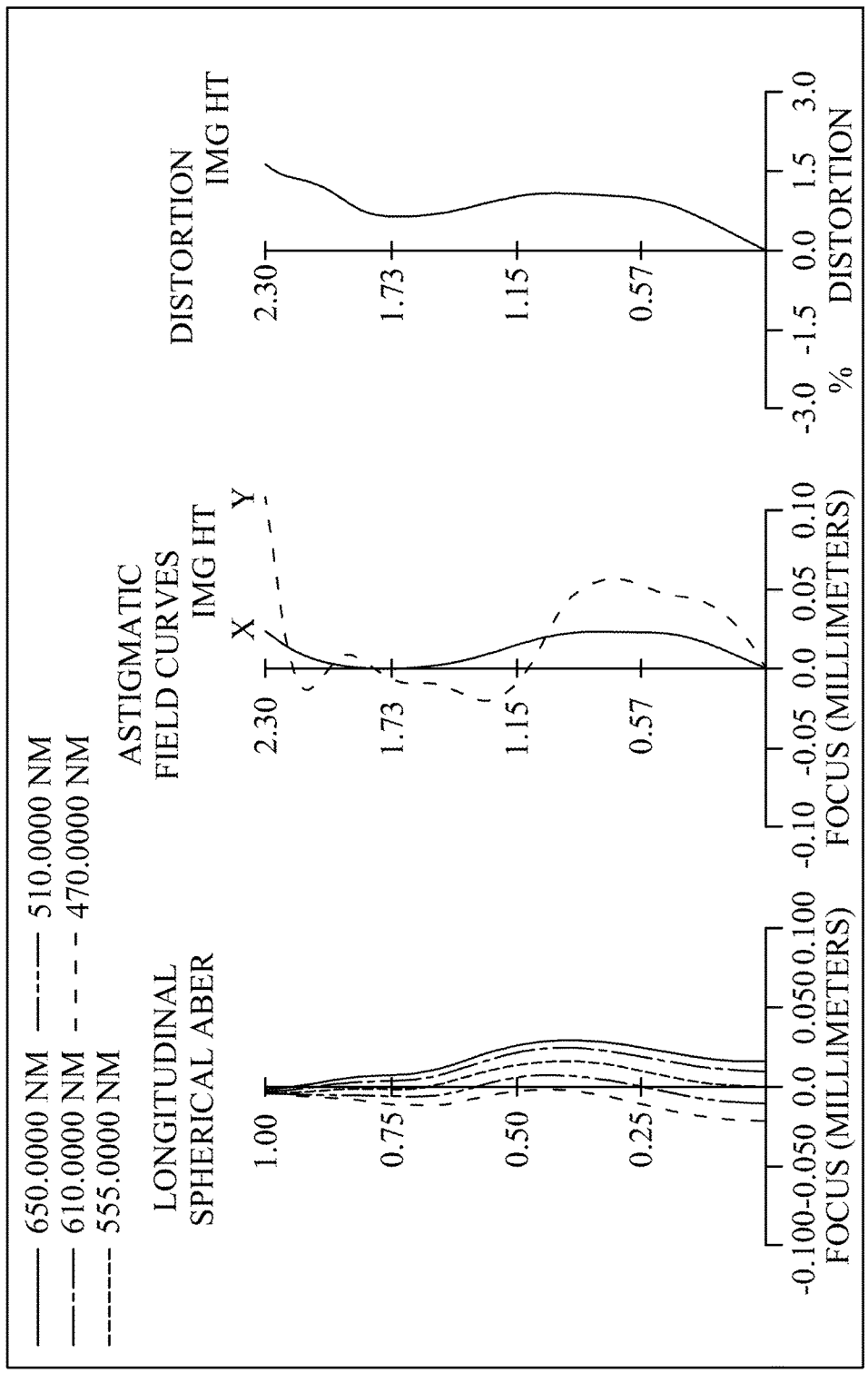
FIG. 5B is longitudinal spherical aberration curves, astigmatic field curves, and an optical distortion grid of the optical image capturing system in the order from left to right according to the fifth embodiment of the present application.
Figure 5C:
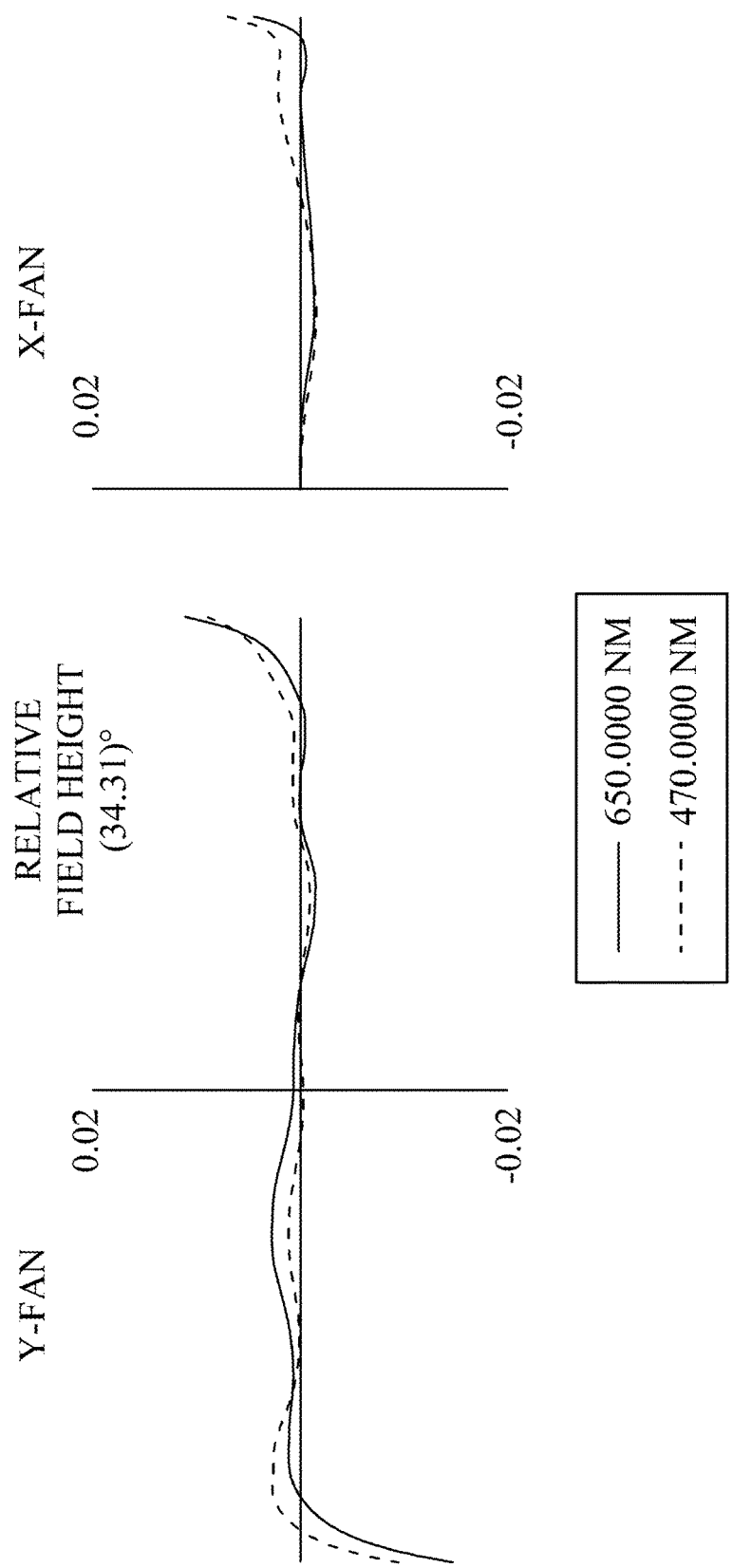
FIG. 5C is a lateral aberration diagram of tangential fan, sagittal fan, the longest operation wavelength and the shortest operation wavelength passing through an edge of the entrance pupil and incident on the image plane by 0.7 HOI according to the fifth embodiment of the present application.

Please refer to FIG. 5A, FIG. 5B and FIG. 5C, FIG. 5A is a schematic view of the optical image capturing system according to the fifths embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a lateral aberration diagram of tangential fan, sagittal fan, the longest operation wavelength and the shortest operation wavelength passing through an edge of the entrance pupil and incident on the image plane by 0.7 HOI according to the fifth embodiment of the present application. As shown in FIG. 5A, in order from an object side to an image side, the optical image capturing system includes an aperture stop 500, a first lens element 510, a second lens element 520, a third lens element 530, a fourth lens element 540, an IR-bandstop filter 570, an image plane 580, and an image sensing device 590.

The first lens element 510 has positive refractive power and it is made of plastic material. The first lens element 510 has a convex object-side surface 512 and a convex image-side surface 514, both of the object-side surface 512 and the image-side surface 514 are aspheric, and the object-side surface 512 has an inflection point.

The second lens element 520 has negative refractive power and it is made of plastic material. The second lens element 520 has a convex object-side surface 522 and a concave image-side surface 524, both of the object-side surface 522 and the image-side surface 524 are aspheric, and the image-side surface 524 has an inflection point.

The third lens element 530 has positive refractive power and it is made of plastic material. The third lens element 530 has a concave object-side surface 532 and a convex image-side surface 534, and both of the object-side surface 532 and the image-side surface 534 are aspheric, and the object-side surface 532 and the image-side surface 534 have two inflection points respectively.

The fourth lens element 540 has negative refractive power and it is made of plastic material. The fourth lens element 540 has a convex object-side surface 542 and a concave image-side surface 544, both of the object-side surface 542 and the image-side surface 544 are aspheric, and the object-side surface 542 and the image-side surface 544 have an inflection point respectively.

The IR-bandstop filter 570 is made of glass material without affecting the focal length of the optical image capturing system and it is disposed between the fourth lens element 540 and the image plane 580.

In the optical image capturing system of the fifth embodiment, focal lengths of the second lens element 520 through the fourth lens element 540 are f2, f3 and f4 respectively. The following relations are satisfied: $|f2|+|f3|=14.0488$ mm, $|f1|+|f4|=9.9629$ mm and $|f2|+|f3|>|f1|+|f4|$.

In the optical image capturing system of the fifth embodiment, a sum of focal lengths of all lens elements with positive refractive power is $\Sigma PP$. The following relation is satisfied: $\Sigma PP=f1+f3$. Hereby, it is favorable for allocating the positive refractive power of the first lens element 510 to other positive lens elements and the significant aberrations generated in the process of moving the incident light can be suppressed.

In the optical image capturing system of the fifth embodiment, a sum of focal lengths of all lens elements with negative refractive power is $\Sigma NP$. The following relation is satisfied: $\Sigma NP=f2+f4$. Hereby, it is favorable for allocating the negative refractive power of the fourth lens element 540 to other negative lens elements.

Please refer to the following Table 9 and Table 10.

The detailed data of the optical image capturing system of the fifth embodiment is as shown in Table 9.

TABLE 9

Data of the optical image capturing system
f = 2.3442 mm, f/HEP = 2.050, HAF = 44.000 deg, tan(HAF) = 0.96569

| Surface # | | Curvature Radius | Thickness | Material | Index | Abbe # | Focal length |
|---|---|---|---|---|---|---|---|
| 0 | Object | Plano | At infinity | | | | |
| 1 | Ape. stop | Plano | −0.050 | | | | |
| 2 | Lens 1 | 1.791162158 | 0.525 | Plastic | 1.544 | 56.09 | 3.099 |
| 3 | | −27.29469639 | 0.001 | | | | |
| 4 | Shading sheet | Plano | 0.240 | | | | |
| 5 | Lens 2 | 192.2396163 | 0.216 | Plastic | 1.642 | 22.46 | −11.145 |
| 6 | | 6.953278033 | 0.193 | | | | |
| 7 | Lens 3 | −0.913380109 | 0.451 | Plastic | 1.546 | 54.48 | 2.904 |
| 8 | | −0.681500067 | 0.025 | | | | |
| 9 | Lens 4 | 1.369493694 | 0.522 | Plastic | 1.544 | 56.09 | −6.864 |
| 10 | | 0.867955184 | 0.278 | | | | |
| 11 | IR-bandstop filter | Plano | 0.200 | BK_7 | 1.517 | 64.13 | |
| 12 | | Plano | 0.800 | | | | |
| 13 | Image plane | Plano | | | | | |

Reference wavelength (d-line) = 555 nm; The clear aperture of the fourth surface is 0.728 mm.

As for the parameters of the aspheric surfaces of the fifth embodiment, reference is made to Table 10.

TABLE 10

Aspheric Coefficients

| | Surface # | | | | | |
|---|---|---|---|---|---|---|
| | 2 | 3 | 5 | 6 | 7 | 8 |
| k = | −2.141502E+01 | −2.687513E−06 | −3.678229E−02 | −9.000000E+01 | −1.332714E−01 | −3.658620E+00 |
| A4 = | 4.700290E−01 | −3.732708E−01 | −9.826101E−01 | −3.445585E−01 | 7.235676E−01 | −8.232659E−01 |
| A6 = | −2.683426E+00 | −1.998799E−01 | 3.226924E+00 | 1.102678E+00 | −1.438860E+00 | 1.198598E+00 |
| A8 = | 1.389267E+01 | 4.282276E−01 | −2.577515E+01 | −3.424785E+00 | 1.360767E+01 | 2.281161E+00 |
| A10 = | −5.256507E+01 | −4.690586E+00 | 7.478240E+01 | 3.549108E+00 | −4.606272E+01 | −1.926093E+01 |
| A12 = | 1.075951E+02 | 1.398585E+01 | −8.865238E+01 | −2.747822E−01 | 7.360258E+01 | 5.804735E+01 |
| A14 = | −9.322212E+01 | −1.408746E+01 | 3.660682E+01 | −9.260552E−01 | −5.702299E+01 | −9.340076E+01 |
| A16 = | 0.000000E+00 | 0.000000E+00 | 0.000000E+00 | 0.000000E+00 | 1.753693E+01 | 8.549761E+01 |
| A18 = | 0.000000E+00 | 0.000000E+00 | 0.000000E+00 | 0.000000E+00 | 0.000000E+00 | −4.209504E+01 |
| A20 = | 0.000000E+00 | 0.000000E+00 | 0.000000E+00 | 0.000000E+00 | 0.000000E+00 | 8.614764E+00 |

| | Surface # | |
|---|---|---|
| | 9 | 10 |
| k = | −1.314189E−01 | −4.161514E+00 |
| A4 = | −4.761457E−01 | −2.784669E−01 |
| A6 = | 3.201405E−01 | 3.950550E−01 |

TABLE 10-continued

| Aspheric Coefficients | | |
|---|---|---|
| A8 = | −2.647136E−01 | −5.603426E−01 |
| A10 = | 1.281055E−01 | 5.891637E−01 |
| A12 = | −3.566120E−03 | −4.285164E−01 |
| A14 = | −2.900744E−02 | 2.060858E−01 |
| A16 = | 5.858937E−03 | −6.204344E−02 |
| A18 = | 5.235025E−03 | 1.053173E−02 |
| A20 = | −1.882416E−03 | −7.669237E−04 |

The presentation of the aspheric surface formula in the fifth embodiment is similar to that in the first embodiment. Besides the definitions of parameters in following tables are equal to those in the first embodiment so the repetitious details will not be given here.

The following contents may be deduced from Table 9 and Table 10.

| Fifth embodiment (Primary reference wavelength: 555 nm) | | | | | |
|---|---|---|---|---|---|
| InRS41 | InRS42 | HVT41 | HVT42 | \|ODT\|% | \|TDT\|% |
| −0.00511 | −0.08752 | 0.87050 | 1.11365 | 1.60000 | 0.98180 |
| \|f/f1\| | \|f/f2\| | \|f/f3\| | \|f/f4\| | \|f1/f2\| | \|f2/f3\| |
| 0.75645 | 0.21035 | 0.80715 | 0.34153 | 0.27807 | 3.83725 |
| ΣPPR | ΣNPR | ΣPPR/\|ΣNPR\| | ΣPP | ΣNP | f1/ΣPP |
| 1.56360 | 0.55188 | 2.83325 | 6.00327 | −18.00837 | 0.51622 |
| f4/ΣNP | IN12/f | IN23/f | IN34/f | TP3/f | TP4/f |
| 0.38115 | 0.10280 | 0.08212 | 0.01066 | 0.19226 | 0.22263 |
| InTL | HOS | HOS/HOI | InS/HOI | InTL/HOS | ΣTP/InTL |
| 2.17242 | 3.45000 | 1.50000 | 0.98551 | 0.62969 | 0.78895 |
| (TP1 + IN12)/TP2 | (TP4 + IN34)/TP3 | TP1/TP2 | TP3/TP4 | IN23/(TP2 + IN23 + TP3) | |
| 3.54633 | 1.21348 | 2.43104 | 0.86355 | 0.22403 | |
| \|INRS41\|/TP4 | \|INRS42\|/TP4 | HVT41/HOI | HVT42/HOS | | |
| 0.00980 | 0.16769 | 0.48420 | 0.32280 | | |
| PLTA | PSTA | NLTA | NSTA | SLTA | SSTA |
| 0.009 mm | 0.011 mm | −0.010 mm | −0.015 mm | 0.007 mm | 0.005 mm |

The following contents may be deduced from Table 9 and Table 10.

| Related inflection point values of fifth embodiment (Primary reference wavelength: 555 nm) | | | | | | | |
|---|---|---|---|---|---|---|---|
| HIF111 | 0.48673 | HIF111/HOI | 0.21162 | SGI111 | 0.06155 | \|SGI111\|/(\|SGI111\| + TP1) | 0.10488 |
| HIF211 | 0.02105 | HIF211/HOI | 0.009151 | SGI211 | 0.000001 | \|SGI211\|/(\|SGI211\| + TP2) | 0.000005 |
| HIF221 | 0.20504 | HIF221/HOI | 0.08915 | SGI221 | 0.00243 | \|SGI221\|/(\|SGI221\| + TP2) | 0.011119 |
| HIF311 | 0.38441 | HIF311/HOI | 0.16713 | SGI311 | −0.06918 | \|SGI311\|/(\|SGI311\| + TP3) | 0.13307 |
| HIF312 | 0.91437 | HIF312/HOI | 0.39755 | SGI312 | −0.13308 | \|SGI312\|/(\|SGI312\| + TP3) | 0.22796 |
| HIF321 | 0.61714 | HIF321/HOI | 0.26832 | SGI321 | −0.26044 | \|SGI321\|/(\|SGI321\| + TP3) | 0.36623 |
| HIF322 | 0.97913 | HIF322/HOI | 0.42571 | SGI322 | −0.35946 | \|SGI322\|/(\|SGI322\| + TP3) | 0.44370 |
| HIF411 | 0.44110 | HIF411/HOI | 0.19178 | SGI411 | 0.05670 | \|SGI411\|/(\|SGI411\| + TP4) | 0.09800 |
| HIF421 | 0.48507 | HIF421/HOI | 0.21090 | SGI421 | 0.10087 | \|SGI421\|/(\|SGI421\| + TP4) | 0.16196 |

The numerical related to the length of outline curve is shown according to table 9 and table 10.

| Fifth embodiment (Primary reference wavelength: 555 nm) | | | | | | |
|---|---|---|---|---|---|---|
| ARE | ½(HEP) | ARE value | ARE − ½(HEP) | 2(ARE/HEP)% | TP | ARE/TP (%) |
| 11 | 0.572 | 0.578 | 0.006 | 101.05% | 0.525 | 109.99% |
| 12 | 0.572 | 0.577 | 0.005 | 100.85% | 0.525 | 109.77% |
| 21 | 0.572 | 0.590 | 0.019 | 103.27% | 0.216 | 273.27% |
| 22 | 0.572 | 0.571 | −0.00042 | 99.93% | 0.216 | 264.42% |
| 31 | 0.572 | 0.585 | 0.013 | 102.30% | 0.451 | 129.78% |
| 32 | 0.572 | 0.625 | 0.053 | 109.35% | 0.451 | 138.73% |
| 41 | 0.572 | 0.578 | 0.006 | 101.07% | 0.522 | 110.72% |
| 42 | 0.572 | 0.587 | 0.016 | 102.74% | 0.522 | 112.56% |
| ARS | EHD | ARS value | ARS − EHD | (ARS/EHD)% | TP | ARS/TP (%) |
| 11 | 0.598 | 0.604 | 0.006 | 101.05% | 0.525 | 115.01% |
| 12 | 0.710 | 0.741 | 0.031 | 104.37% | 0.525 | 141.07% |
| 21 | 0.729 | 0.798 | 0.070 | 109.58% | 0.216 | 369.50% |
| 22 | 0.882 | 0.901 | 0.019 | 102.16% | 0.216 | 416.89% |
| 31 | 0.942 | 0.959 | 0.016 | 101.73% | 0.451 | 212.72% |
| 32 | 0.986 | 1.095 | 0.109 | 111.02% | 0.451 | 243.00% |
| 41 | 1.387 | 1.413 | 0.026 | 101.86% | 0.522 | 270.73% |
| 42 | 1.749 | 1.883 | 0.134 | 107.66% | 0.522 | 360.73% |

The Sixth Embodiment (Embodiment 6)

Figure 6A:
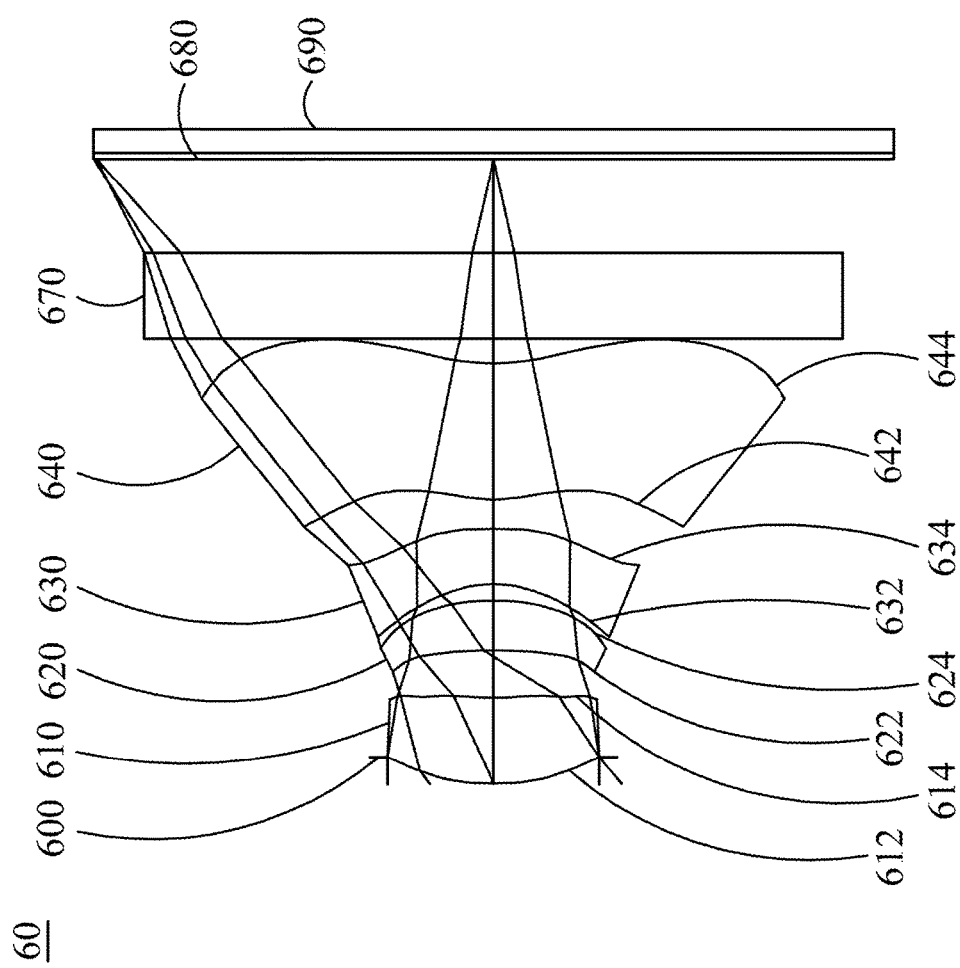
FIG. 6A is a schematic view of the optical image capturing system according to the sixth embodiment of the present application.
Figure 6B:
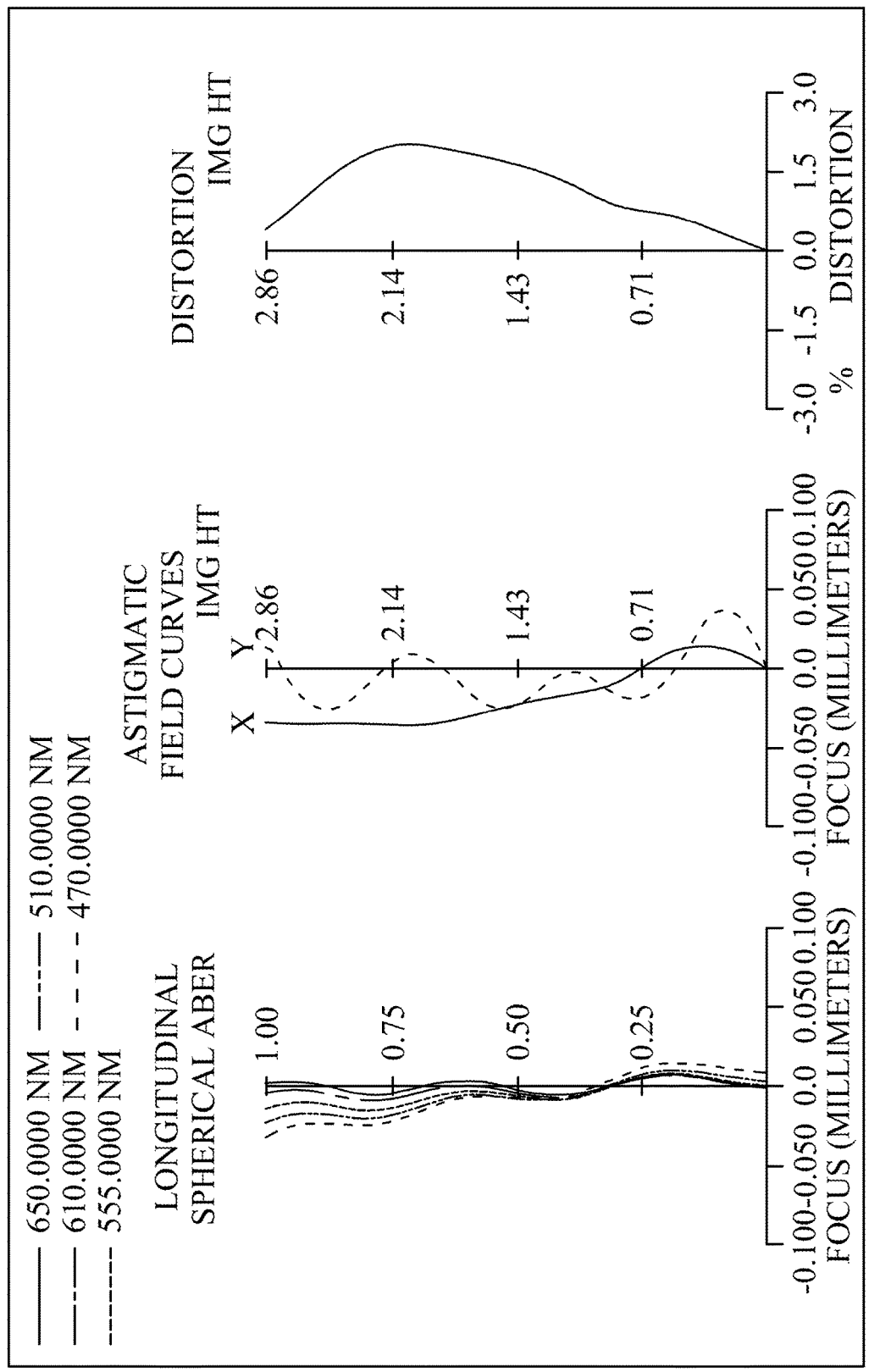
FIG. 6B is longitudinal spherical aberration curves, astigmatic field curves, and an optical distortion grid of the optical image capturing system in the order from left to right according to the sixth embodiment of the present application.
Figure 6C:
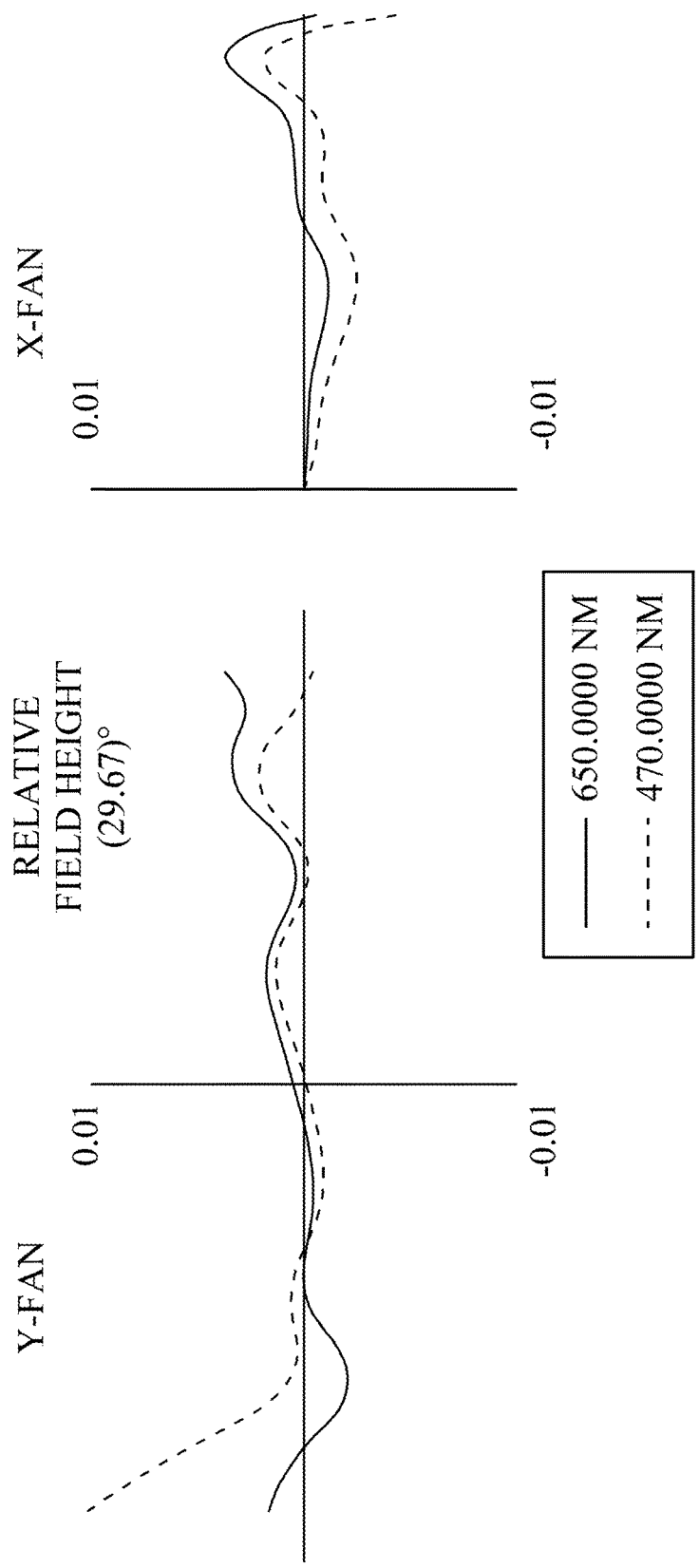
FIG. 6C is a lateral aberration diagram of tangential fan, sagittal fan, the longest operation wavelength and the shortest operation wavelength passing through an edge of the entrance pupil and incident on the image plane by 0.7 HOI according to the sixth embodiment of the present application.

Please refer to FIG. 6A, FIG. 6B and FIG. 6C, FIG. 6A is a schematic view of the optical image capturing system according to the sixth Embodiment of the present application, FIG. 6B is longitudinal spherical aberration curves, astigmatic field curves, and an optical distortion curve of the optical image capturing system in the order from left to right according to the sixth Embodiment of the present application, and FIG. 6C is a lateral aberration diagram of tangential fan, sagittal fan, the longest operation wavelength and the shortest operation wavelength passing through an edge of the entrance pupil and incident on the image plane by 0.7 HOI according to the sixth embodiment by the present application. As shown in FIG. 6A, in order from an object side to an image side, the optical image capturing system includes a first lens element 610, an aperture stop 600, a second lens element 620, a third lens element 630, a fourth lens element 640, an IR-bandstop filter 670, an image plane 680, and an image sensing device 690.

The first lens element 610 has positive refractive power and it is made of plastic material. The first lens element 610 has a convex object-side surface 612 and a concave image-side surface 614, both of the object-side surface 612 and the image-side surface 614 are aspheric, and the object-side surface 612 and the image-side surface 614 have an inflection point respectively.

The second lens element 620 has positive refractive power and it is made of plastic material. The second lens element 620 has a concave object-side surface 622 and a convex image-side surface 624, and both of the object-side surface 622 and the image-side surface 624 are aspheric.

The third lens element 630 has negative refractive power and it is made of plastic material. The third lens element 630 has a concave object-side surface 632 and a convex image-side surface 634, both of the object-side surface 632 and the image-side surface 634 are aspheric, and the image-side surface 634 has an inflection point.

The fourth lens element 640 has positive refractive power and it is made of plastic material. The fourth lens element 640 has a convex object-side surface 642 and a concave image-side surface 644, both of the object-side surface 642 and the image-side surface 644 are aspheric. The object-side surface 642 has two inflection points and the image-side surface 644 has an inflection point.

The IR-bandstop filter 670 is made of glass material without affecting the focal length of the optical image capturing system and it is disposed between the fourth lens element 640 and the image plane 680.

In the optical image capturing system of the sixth Embodiment, focal lengths of the second lens element 620 through the fourth lens element 640 are f2, f3 and f4 respectively. The following relations are satisfied: |f2|+|f3|=7.6703 mm and |f1|+|f4|=7.7843 mm.

In the optical image capturing system of the sixth Embodiment, a sum of focal lengths of all lens elements with positive refractive power is ΣPP. The following relations are satisfied: ΣPP=f1+f3. Hereby, it is favorable for allocating the positive refractive power of the first lens element 610 to other positive lens elements and the significant aberrations generated in the process of moving the incident light can be suppressed.

In the optical image capturing system of the sixth Embodiment, a sum of focal lengths of all lens elements with negative refractive power is ΣNP. The following relations are satisfied: ΣNP-f2+f4. Hereby, it is favorable for allocating the negative refractive power of the fourth lens element 640 to other negative lens elements.

Please refer to the following Table 11 and Table 12.

The detailed data of the optical image capturing system of the sixth Embodiment is as shown in Table 11.

TABLE 11

Data of the optical image capturing system
f = 3.4320 mm; f/HEP = 2.28; HAF = 39.5498 deg; tan(HAF) = 0.8258

| Surface # | | Curvature Radius | Thickness | Material | Index | Abbe # | Focal length |
|---|---|---|---|---|---|---|---|
| 0 | Object | Plano | 600 mm | | | | |
| 1 | Shading sheet | Plano | 0.000 | | | | |
| 2 | Ape. Stop/ Lens 1 | 1.509818182 | 0.618 | Plastic | 1.535 | 56.07 | 3.318 |
| 3 | | 8.53969299 | 0.329 | | | | |
| 4 | Lens 2 | −6.014903199 | 0.354 | Plastic | 1.535 | 56.07 | 5.358 |
| 5 | | −1.984502862 | 0.116 | | | | |
| 6 | Lens 3 | −1.059010347 | 0.400 | Plastic | 1.642 | 22.46 | −2.313 |
| 7 | | −4.151190913 | 0.209 | | | | |
| 8 | Lens 4 | 1.152314669 | 0.971 | Plastic | 1.535 | 56.07 | 4.467 |
| 9 | | 1.5669645 | 0.174 | | | | |
| 10 | IR-bandstop filter | Plano | 0.610 | BK_7 | 1.517 | 64.13 | 1E+18 |
| 11 | | Plano | 0.670 | | | | |
| 12 | Image plane | Plano | 0.000 | | | | |

Reference wavelength = 555 nm; shield position: clear aperture (CA) of the first plano = 0.72 mm, clear aperture (CA) of the fourth plano = 0.72 mm.

As for the parameters of the aspheric surfaces of the sixth Embodiment, reference is made to Table 12.

TABLE 12

Aspheric Coefficients

| Surface # | | | | | | |
|---|---|---|---|---|---|---|
| | 2 | 3 | 4 | 5 | 6 | 7 |
| k = | 1.916080E+00 | −9.900000E+01 | 3.126612E+01 | −7.965379E+00 | −8.303619E−01 | −6.965851E+00 |
| A4 = | −1.049827E−01 | −7.009159E−02 | −1.451689E−01 | −4.538029E−01 | −5.412535E−01 | −1.203501E+00 |
| A6 = | 5.814123E−01 | 1.328381E−01 | 6.303788E−01 | 1.530283E+00 | 2.791713E+00 | 3.666830E+00 |
| A8 = | −6.718107E+00 | −9.116008E−01 | −1.132911E+01 | −1.236917E+01 | −1.513262E+01 | −8.896333E+00 |
| A10 = | 3.531928E+01 | 7.640451E−01 | 6.805609E+01 | 4.610285E+01 | 5.138291E+01 | 1.655336E+01 |
| A12 = | −1.101217E+02 | 3.051780E+00 | −2.379915E+02 | −9.647195E+01 | −9.520918E+01 | −2.064112E+01 |
| A14 = | 2.064916E+02 | −9.347255E+00 | 4.983122E+02 | 1.170989E+02 | 9.234444E+01 | 1.655931E+01 |
| A16 = | −2.297285E+02 | 8.045808E+00 | −6.309790E+02 | −7.956394E+01 | −3.388934E+01 | −8.186992E+00 |
| A18 = | 1.385918E+02 | −1.221506E+00 | 4.484590E+02 | 2.631311E+01 | −1.040105E+01 | 2.273253E+00 |
| A20 = | −3.506966E+01 | 1.406385E−01 | −1.380228E+02 | −3.193777E+00 | 8.371347E+00 | −2.718499E−01 |

| | Surface # | |
|---|---|---|
| | 8 | 9 |
| k = | −1.187975E+01 | −7.017602E−01 |
| A4 = | −4.135674E−01 | −2.642810E−01 |
| A6 = | 2.543691E−01 | 1.378942E−01 |
| A8 = | −2.660257E−03 | −6.371856E−02 |
| A10 = | −1.503202E−01 | 2.245800E−02 |
| A12 = | 1.195738E−01 | −6.023087E−03 |
| A14 = | −4.203653E−02 | 1.127358E−03 |
| A16 = | 7.846661E−03 | −1.323108E−04 |
| A18 = | −7.498286E−04 | 8.321783E−06 |
| A20 = | 2.899932E−05 | −2.161104E−07 |

In the sixth Embodiment, the presentation of the aspheric surface formula is similar to that in the first embodiment. Besides, the definitions of parameters in following tables are equal to those in the first embodiment, so the repetitious details will not be given here.

The following contents may be deduced from Table 11 and Table 12.

Sixth Embodiment (Primary reference wavelength: 555 nm)

| InRS41 | InRS42 | HVT41 | HVT42 | |ODT|% | |TDT|% |
|---|---|---|---|---|---|
| −0.19362 | −0.25529 | 0.61419 | 1.21734 | 2.01839 | 1.61834 |
| |f/f1| | |f/f2| | |f/f3| | |f/f4| | |f1/f2| | |f2/f3| |
| 1.03444 | 0.64059 | 1.48400 | 0.76840 | 0.61927 | 2.31660 |
| ΣPPR | ΣNPR | ΣPPR/|ΣNPR| | ΣPP | ΣNP | f1/ΣPP |
| 2.51843 | 1.40899 | 1.78740 | 1.00509 | 9.82409 | 3.30099 |
| f4/ΣNP | IN12/f | IN23/f | IN34/f | TP3/f | TP4/f |

Sixth Embodiment (Primary reference wavelength: 555 nm)

| 0.45465 | 0.09578 | 0.03366 | 0.06079 | 0.11643 | 0.28302 |
|---|---|---|---|---|---|
| InTL | HOS | HOS/HOI | InS/HOS | InTL/HOS | ΣTP/InTL |
| 2.99601 | 4.44999 | 1.55812 | 0.95673 | 0.67326 | 0.78208 |
| (TP1 + IN12)/TP2 | (TP4 + IN34)/TP3 | TP1/TP2 | TP3/TP4 | IN23/(TP2 + IN23 + TP3) | |
| 2.67357 | 2.95298 | 1.74532 | 0.41138 | 0.13291 | |
| |INRS41|/TP4 | |INRS42|/TP4 | |HVT42|/HOI | HVT42/HOS | | |
| 0.19933 | 0.26283 | 0.42624 | 0.27356 | | |
| PLTA | PSTA | NLTA | NSTA | SLTA | SSTA |
| −0.00049 mm | 0.00375 mm | 0.01012 mm | 0.00160 mm | −0.00428 mm | −0.00062 mm |

The following contents may be deduced from Table 11 and Table 12.

Related inflection point values of sixth Embodiment (Primary reference wavelength: 555 nm)

| HIF111 | 0.74316 | HIF111/HOI | 0.26021 | SGI111 | 0.18567 | |SGI111|/(|SGI111| + TP1) | 0.23101 |
|---|---|---|---|---|---|---|---|
| HIF121 | 0.32842 | HIF121/HOI | 0.11499 | SGI121 | 0.00534 | |SGI121|/(|SGI121| + TP1) | 0.00857 |
| HIF321 | 0.70196 | HIF321/HOI | 0.24579 | SGI321 | −0.15758 | |SGI321|/(|SGI321| + TP3) | 0.28283 |
| HIF411 | 0.29817 | HIF411/HOI | 0.10440 | SGI411 | 0.03024 | |SGI411|/(|SGI411| + TP4) | 0.03019 |
| HIF412 | 1.21277 | HIF412/HOI | 0.42464 | SGI412 | −0.12205 | |SGI412|/(|SGI412| + TP4) | 0.11163 |
| HIF421 | 0.55723 | HIF421/HOI | 0.19511 | SGI421 | 0.07815 | |SGI421|/(|SGI421| + TP4) | 0.07446 |

The numerical related to the length of outline curve is shown according to table 11 and table 12.

Sixth Embodiment (Primary reference wavelength: 555 nm)

| ARE | ½(HEP) | ARE value | ARE − ½(HEP) | 2(ARE/HEP) % | TP | ARE/TP (%) |
|---|---|---|---|---|---|---|
| 11 | 0.720 | 0.747 | 0.027 | 103.78% | 0.618 | 120.93% |
| 12 | 0.752 | 0.753 | 0.001 | 100.18% | 0.618 | 121.81% |
| 21 | 0.720 | 0.752 | 0.032 | 104.46% | 0.354 | 212.38% |
| 22 | 0.758 | 0.829 | 0.072 | 109.46% | 0.354 | 234.19% |
| 31 | 0.758 | 0.838 | 0.080 | 110.57% | 0.400 | 209.65% |
| 32 | 0.758 | 0.789 | 0.031 | 104.11% | 0.400 | 197.41% |
| 41 | 0.758 | 0.761 | 0.004 | 100.48% | 0.971 | 78.37% |
| 42 | 0.758 | 0.768 | 0.010 | 101.36% | 0.971 | 79.06% |

| ARS | EHD | ARS value | ARS − EHD | (ARS/EHD) % | TP | ARS/TP (%) |
|---|---|---|---|---|---|---|
| 11 | 0.720 | 0.747 | 0.027 | 103.78% | 0.618 | 120.93% |
| 12 | 0.752 | 0.753 | 0.001 | 100.18% | 0.618 | 121.81% |
| 21 | 0.720 | 0.752 | 0.032 | 104.46% | 0.354 | 212.38% |
| 22 | 0.810 | 0.917 | 0.107 | 113.21% | 0.354 | 258.97% |
| 31 | 0.826 | 0.924 | 0.098 | 111.92% | 0.400 | 231.24% |
| 32 | 1.040 | 1.085 | 0.045 | 104.31% | 0.400 | 271.50% |
| 41 | 1.349 | 1.406 | 0.057 | 104.24% | 0.971 | 144.76% |
| 42 | 2.078 | 2.237 | 0.160 | 107.68% | 0.971 | 230.32% |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to an image side, comprising:
   a first lens element with refractive power;
   a second lens element with refractive power;
   a third lens element with refractive power;
   a fourth lens element with refractive power; and
   an image plane;
   wherein the optical image capturing system consists of the four lens elements with refractive power, at least one of the first through lens elements has positive refractive power, an object-side surface and an image-side surface of the fourth lens element are aspheric, a focal length of the optical image capturing system is f, an entrance pupil diameter of the optical image capturing system is HEP, a distance from an object-side surface of the first lens element to the image plane is HOS, a distance on an optical axis from the object-side surface of the first lens element to the image-side surface of the fourth lens element is InTL, a length of outline curve from an axial point on any surface of any one of the four lens elements to a coordinate point of vertical height with a distance of a half of the entrance pupil diameter from the optical axis on the surface along an outline of the surface is denoted as ARE, TV distortion for image formation in the optical image capturing system is TDT, a height for image formation on the image plane perpendicular to the optical axis in the optical image capturing system is denoted by HOI, a lateral aberration of the longest operation wavelength of a positive direction tangential fan of the optical image capturing system passing through an edge of the entrance pupil and incident on the image plane by 0.7 HOI is denoted as PLTA, and a lateral aberration of the shortest operation wavelength of the positive direction tangential fan of the optical image capturing system passing through the edge of the entrance pupil and incident on the image plane by 0.7 HOI is denoted as PSTA, a lateral aberration of the longest operation wavelength of a negative direction tangential fan of the optical image capturing system passing through the edge of the entrance pupil and incident on the image plane by 0.7 HOI is denoted as NLTA, a lateral aberration of the shortest operation wavelength of a negative direction tangential fan of the optical image capturing system passing through the edge of the entrance pupil and incident on the image plane by 0.7 HOI is denoted as NSTA, a lateral aberration of the longest operation wavelength of a sagittal fan of the optical image capturing system passing through the edge of the entrance pupil and incident on the image plane by 0.7 HOI is denoted as SLTA, a lateral aberration of the shortest operation wavelength of the sagittal fan of the optical image capturing system passing through the edge of the entrance pupil and incident on the image plane by 0.7 HOI is denoted as SSTA, and the following relations are satisfied: $1.2 \leq f/HEP \leq 6.0$; $0.5 \leq HOS/f \leq 3.0$; $0 < InTL/HOS < 0.9$; $1 \leq 2(ARE/HEP) \leq 1.5$; PLTA$\leq$20 μm, PSTA$\leq$20 μm, NLTA$\leq$20 μm, NSTA$\leq$20 μm, SLTA$\leq$20 μm and SSTA$\leq$20 μm; |TDT|<100%.

2. The optical image capturing system of claim 1, wherein a maximum effective half diameter position of any surface of any one of the four lens elements is denoted as EHD, and a length of outline curve from an axial point on any surface of any one of the four lens elements to the maximum effective half diameter position of the surface along the outline of the surface is denoted as ARS, and the following relation is satisfied: $1 \leq ARS/EHD \leq 1.5$.

3. The optical image capturing system of claim 1, wherein the following relation is satisfied: 0 mm<HOS$\leq$10 mm.

4. The optical image capturing system of claim 1, wherein a half of a maximal view angle of the optical image capturing system is HAF, and the following relation is satisfied: 0 deg<HAF$\leq$80 deg.

5. The optical image capturing system of claim 1, wherein a length of outline curve from an axial point on the object-side surface of the fourth lens element to a coordinate point of vertical height with a distance of a half of the entrance pupil diameter from the optical axis on the surface along an outline of the surface is denoted as ARE41; a length of outline curve from an axial point on the image-side surface of the fourth lens element to the coordinate point of vertical height with the distance of a half of the entrance pupil diameter from the optical axis on the surface along the outline of the surface is denoted as ARE42, and a thickness of the fourth lens element on the optical axis is TP4, and the following relations are satisfied: 0.5≤ARE41/TP4 TP4≤15; and 0.5≤ARE42/TP4≤15.

6. The optical image capturing system of claim 1, wherein a length of outline curve from an axial point on the object-side surface of the third lens element to a coordinate point of vertical height with a distance of a half of the entrance pupil diameter from the optical axis on the surface along an outline of the surface is denoted as ARE31; a length of outline curve from an axial point on the image-side surface of the third lens element to the coordinate point of vertical height with the distance of a half of the entrance pupil diameter from the optical axis on the surface along the outline of the surface is denoted as ARE32, and a thickness of the third lens element on the optical axis is TP3, and the following relations are satisfied: 0.5≤ARE31/TP3≤15 and 0.5≤ARE32/TP3≤15.

7. The optical image capturing system of claim 1, wherein the second lens element has a negative refractive power and the fourth lens element has a negative refractive power.

8. The optical image capturing system of claim 1, further comprising an aperture stop, a distance from the aperture stop to the image plane on the optical axis is InS, a height for image formation on the image plane perpendicular to the optical axis in the optical image capturing system is HOI and the following relation is satisfied: 0.2≤InS/HOS≤ 1.1 and 0.5<HOS/HOI≤1.6.

9. An optical image capturing system, from an object side to an image side, comprising:
a first lens element with positive refractive power;
a second lens element with refractive power;
a third lens element with refractive power;
a fourth lens element with refractive power; and
an image plane;
wherein the optical image capturing system consists of the four lens elements with refractive power, at least two lens elements among the first through fourth lens elements respectively have at least one inflection point on at least one surface thereof, at least one of the second through fourth lens elements has positive refractive power, an object-side surface and an image-side surface of the fourth lens element are aspheric, a focal length of the optical image capturing system is f, an entrance pupil diameter of the optical image capturing system is HEP, a distance from an object-side surface of the first lens element to the image plane is HOS, a distance on an optical axis from the object-side surface of the first lens element to the image-side surface of the fourth lens element is InTL, a length of outline curve from an axial point on any surface of any one of the four lens elements to a coordinate point of vertical height with a distance of a half of the entrance pupil diameter from the optical axis on the surface along an outline of the surface is denoted as ARE, a height for image formation on the image plane perpendicular to the optical axis in the optical image capturing system is denoted by HOI, a lateral aberration of the longest operation wavelength of a positive direction tangential fan of the optical image capturing system passing through an edge of the entrance pupil and incident on the image plane by 0.7 HOI is denoted as PLTA, and a lateral aberration of the shortest operation wavelength of the positive direction tangential fan of the optical image capturing system passing through the edge of the entrance pupil and incident on the image plane by 0.7 HOI is denoted as PSTA, a lateral aberration of the longest operation wavelength of a negative direction tangential fan of the optical image capturing system passing through the edge of the entrance pupil and incident on the image plane by 0.7 HOI is denoted as NLTA, a lateral aberration of the shortest operation wavelength of a negative direction tangential fan of the optical image capturing system passing through the edge of the entrance pupil and incident on the image plane by 0.7 HOI is denoted as NSTA, a lateral aberration of the longest operation wavelength of a sagittal fan of the optical image capturing system passing through the edge of the entrance pupil and incident on the image plane by 0.7 HOI is denoted as SLTA, a lateral aberration of the shortest operation wavelength of the sagittal fan of the optical image capturing system passing through the edge of the entrance pupil and incident on the image plane by 0.7 HOI is denoted as SSTA, and the following relations are satisfied: 1.2≤f/HEP≤6.0; 0.5≤HOS/f≤<3.0; 0<InTL/HOS<0.9; 1≤2(ARE/HEP)≤1.5; PLTA≤20 µm, PSTA≤20 µm, NLTA≤20 µm, NSTA≤20 µm, SLTA≤20 µm and SSTA≤20 µm.

10. The optical image capturing system of claim 9, wherein a maximum effective half diameter position of any surface of any one of the four lens elements is denoted as EHD, and a length of outline curve from an axial point on any surface of any one of the four lens elements to the maximum effective half diameter position of the surface along the outline of the surface is denoted as ARS, and the following relation is satisfied: 1≤ARS/EHD≤1.5.

11. The optical image capturing system of claim 9, wherein the fourth lens element has a negative refractive power, and at least one surface among the object-side surface and the image-side surface of the fourth lens element has at least one inflection point.

12. The optical image capturing system of claim 9, wherein the second lens element has a negative refractive power.

13. The optical image capturing system of claim 9, wherein a distance between the first lens element and the second lens element on the optical axis is IN12, and the following relation is satisfied: 0<IN12/f≤0.25.

14. The optical image capturing system of claim 9, wherein a distance between the third lens element and the fourth lens element on the optical axis is IN34, and the following relation is satisfied: 0<IN34/f≤0.8.

15. The optical image capturing system of claim 9, wherein the distance from the third lens element to the fourth lens element on the optical axis is IN34, a thickness of the third lens element and a thickness of the fourth lens element on the optical axis respectively are TP3 and TP4, and the following relation is satisfied: 1≤(TP4+IN34)/TP3≤10.

16. The optical image capturing system of claim 9, wherein the distance from the first lens element to the second lens element on the optical axis is IN12, a thickness of the first lens element and a thickness of the second lens element on the optical axis respectively are TP1 and TP2, and the following relation is satisfied: 1≤(TP1+IN12)/TP2≤10.

17. The optical image capturing system of claim 9, wherein a distance from the second lens element to the third lens element on the optical axis is IN23, a distance from the third lens element to the fourth lens element on the optical axis is IN34, a thickness of the third lens element on the optical axis is TP3, and the following relation is satisfied: 0<TP3/(IN23+TP3+IN34)<1.

18. An optical image capturing system, from an object side to an image side, comprising:
   a first lens element with positive refractive power;
   a second lens element with refractive power;
   a third lens element with refractive power;
   a fourth lens element with negative refractive power; and
      at least one surface among an object-side surface and an image-side surface of the fourth lens element having at least one inflection point; and
   an image plane;
   wherein the optical image capturing system consists of the four lens elements with refractive power, at least two lens elements among the first through third lens elements respectively have at least one inflection point on at least one surface thereof, an object-side surface and an image-side surface of the third lens element are aspheric, an object-side surface and an image-side surface of the fourth lens element are aspheric, a focal length of the optical image capturing system is f, an entrance pupil diameter of the optical image capturing system is HEP, a half of maximum view angle of the optical image capturing system is HAF, a distance from an object-side surface of the first lens element to the image plane is HOS, a distance on an optical axis from the object-side surface of the first lens element to the image-side surface of the fourth lens element is InTL, a length of outline curve from an axial point on any surface of any one of the four lens elements to a coordinate point of vertical height with a distance of a half of the entrance pupil diameter from the optical axis on the surface along an outline of the surface is denoted as ARE, a height for image formation on the image plane perpendicular to the optical axis in the optical image capturing system is denoted by HOI, a lateral aberration of the longest operation wavelength of a positive direction tangential fan of the optical image capturing system passing through an edge of the entrance pupil and incident on the image plane by 0.7 HOI is denoted as PLTA, and a lateral aberration of the shortest operation wavelength of the positive direction tangential fan of the optical image capturing system passing through the edge of the entrance pupil and incident on the image plane by 0.7 HOI is denoted as PSTA, a lateral aberration of the longest operation wavelength of a negative direction tangential fan of the optical image capturing system passing through the edge of the entrance pupil and incident on the image plane by 0.7 HOI is denoted as NLTA, a lateral aberration of the shortest operation wavelength of a negative direction tangential fan of the optical image capturing system passing through the edge of the entrance pupil and incident on the image plane by 0.7 HOI is denoted as NSTA, a lateral aberration of the longest operation wavelength of a sagittal fan of the optical image capturing system passing through the edge of the entrance pupil and incident on the image plane by 0.7 HOI is denoted as SLTA, a lateral aberration of the shortest operation wavelength of the sagittal fan of the optical image capturing system passing through the edge of the entrance pupil and incident on the image plane by 0.7 HOI is denoted as SSTA, and the following relations are satisfied: $1.2 \le f/HEP \le 3.5$; $0.4 \le |\tan(HAF)| \le 1.8$; $0.5 \le HOS/f \le 2.5$; $0 < InTL/HOS < 0.9$; $1 \le 2(ARE/HEP) \le 1.5$; $PLTA \le 20$ μm, $PSTA \le b\ 20$ μm, $NLTA \le 20$ μm, $NSTA \le 20$ μm, $SLTA \le 20$ μm and $SSTA \le 20$ μm.

19. The optical image capturing system of claim 18, wherein a maximum effective half diameter position of any surface of any one of the four lens elements is denoted as EHD, and a length of outline curve from an axial point on any surface of any one of the four lens elements to the maximum effective half diameter position of the surface along the outline of the surface is denoted as ARS, and the following relation is satisfied: $1 \le ARS/EHD \le 1.5$.

20. The optical image capturing system of claim 18, wherein a height for image formation on the image plane perpendicular to the optical axis in the optical image capturing system is HOI and the following relation is satisfied: $0.5 < HOS/HOI \le 1.6$.

21. The optical image capturing system of claim 18, wherein a length of outline curve from an axial point on the object-side surface of the fourth lens element to a coordinate point of vertical height with a distance of a half of the entrance pupil diameter from the optical axis on the surface along an outline of the surface is denoted as ARE41; a length of outline curve from an axial point on the image-side surface of the fourth lens element to the coordinate point of vertical height with the distance of a half of the entrance pupil diameter from the optical axis on the surface along the outline of the surface is denoted as ARE42, and a thickness of the fourth lens element on the optical axis is TP4, and the following relations are satisfied: $0.5 \le ARE41/TP4 \le 15$ and $0.5 \le ARE42/TP4 \le 15$.

22. The optical image capturing system of claim 18, wherein a length of outline curve from an axial point on the object-side surface of the third lens element to a coordinate point of vertical height with a distance of a half of the entrance pupil diameter from the optical axis on the surface along an outline of the surface is denoted as ARE31; a length of outline curve from an axial point on the image-side surface of the third lens element to the coordinate point of vertical height with the distance of a half of the entrance pupil diameter from the optical axis on the surface along the outline of the surface is denoted as ARE32, and a thickness of the third lens element on the optical axis is TP3, and the following relations are satisfied: $0.5 \le ARE31/TP3 \le 15$ and $0.5 \le ARE32/TP3 \le 15$.

23. The optical image capturing system of claim 18, wherein the optical image capturing system further comprise an aperture stop, an image sensing device and a driving module, the image sensing device is disposed on the image plane and a hundred thousands of pixels are disposed, a distance from the aperture stop to the image plane is InS, and the driving module may couple with the lens elements to displace the lens elements, and the following relation is satisfied: $0.2 \le InS/HOS \le 1.1$.

* * * * *